(12) United States Patent
Naghib et al.

(10) Patent No.: US 11,848,561 B1
(45) Date of Patent: Dec. 19, 2023

(54) OPTIMIZED CONTROL OF RENEWABLE POWERPLANTS

(71) Applicant: 8ME NOVA, LLC, El Dorado Hills, CA (US)

(72) Inventors: Elahesadat Naghib, Seattle, WA (US); Casey Olives, Seattle, WA (US); Finbar Sheehy, San Diego, CA (US)

(73) Assignee: 8ME NOVA, LLC, El Dorado Hills, CA (US)

( * ) Notice: Subject to any disclaimer, the term of this patent is extended or adjusted under 35 U.S.C. 154(b) by 0 days.

(21) Appl. No.: 18/451,595

(22) Filed: Aug. 17, 2023

(51) Int. Cl.
*H02J 3/46* (2006.01)
*H02J 3/00* (2006.01)

(52) U.S. Cl.
CPC .............. *H02J 3/466* (2020.01); *H02J 3/004* (2020.01); *H02J 2203/10* (2020.01); *H02J 2203/20* (2020.01)

(58) Field of Classification Search
CPC ........ H02J 3/466; H02J 3/004; H02J 2203/10; H02J 2203/20
See application file for complete search history.

(56) References Cited

U.S. PATENT DOCUMENTS

| | | | | |
|---|---|---|---|---|
| 11,068,821 B2* | 7/2021 | Wenzel | ...................... | H02J 3/14 |
| 2010/0179704 A1* | 7/2010 | Ozog | ........................ | H02J 7/35 |
| | | | | 703/2 |
| 2010/0179862 A1* | 7/2010 | Chassin | ............. | G06Q 30/0282 |
| | | | | 705/347 |
| 2011/0231028 A1* | 9/2011 | Ozog | ........................ | H02J 3/14 |
| | | | | 700/291 |
| 2012/0296482 A1* | 11/2012 | Steven | .................... | G06Q 40/04 |
| | | | | 700/291 |
| 2015/0381089 A1* | 12/2015 | Tarnowski | ................ | H02J 3/32 |
| | | | | 290/44 |
| 2021/0296897 A1* | 9/2021 | Cruickshank, III | ...... | H02J 9/06 |
| 2021/0304306 A1* | 9/2021 | Sun | ......................... | H02J 3/322 |
| 2022/0284458 A1* | 9/2022 | Sun | .................... | G06Q 10/0635 |

* cited by examiner

*Primary Examiner* — Ziaul Karim
(74) *Attorney, Agent, or Firm* — Foley & Lardner LLP

(57) ABSTRACT

The present disclosure provides systems and methods for optimized control of renewable energy powerplants (REPP). A method may include partitioning an REPP into at least two partitions for a period of time; defining a first bidding strategy of a first partition of the at least two partitions for the period of time, wherein the first partition includes a first allocation of capacity; defining a second bidding strategy of a second partition of the at least two partitions for the period of time, wherein the second partition includes a second allocation of capacity; generating a first score for the first bidding strategy of the first partition and a second score for the second bidding strategy of the second partition; adjusting the at least two partitions based on the first score and the second score; and discharging energy from the REPP according to the adjusted at least two partitions.

15 Claims, 18 Drawing Sheets

1400

Compound bid: "simple power up to 200 MW at $60/MWh; up to an additional 100 MW at $90/MWh; up to 5 MW of Grid Services capacity at $20/MW" — 1402

Bid 1: "Simple power up to 200 MW, price $60/MWh" — 1404

Bid 2: "Simple power up to 100 MW at $90/MWh plus up to 5 MW of grid services at $20/MW" — 1406

Dispatch data:
- 210 MW of simple power accepted and dispatched at $95/MWh clearing price
- 5 MW of Grid Services accepted
  3 MW of Grid services dispatched for 15 minutes

— 1408

Attribute revenues to value scores:
- 200 MW of simple power attributed to Bid 1 (Partition 1) because its price is lower -> 200 MWh x $95/MWh = $19,000 to Partition 1
- Remaining 10 MW of simple power attributed to Bid 2 (Partition 2) -> 10 MWh x $95/MWh = $950 to Partition 2
- Grid services offer from Bid 2 was accepted -> 5 MW x $20 = $100 to Partition 2
- Grid services dispatched 3 MW for 15 minutes -> 0.75 MWh x $95/MWh = $71.25 to Partition 2
- Total revenue attributions: $19,000 to Partition 1, $1,121.25 to Partition 2

OPTIMIZED CONTROL OF RENEWABLE POWERPLANTS

BACKGROUND

Electrical power grids have a system operator that can work to ensure that there is and will be a sufficient supply of electrical power to meet the needs of the electrical loads connected to the grid. The system operator can make plans across multiple time horizons (e.g., near-instantaneous, hour-ahead, day-ahead, year-ahead, and/or multi-year-ahead) to ensure that there will be a sufficient supply of electrical power. In some cases, the suppliers of electrical power to the electrical power grid are powerplants that are operated independently of the system operator. In some of those cases, as part of the process for ensuring supply of power, the system operator may seek bids from powerplant operators for supply of power to the grid. The system operator may seek these bids on multiple time horizons (e.g., time frames). The system operator may select the lowest-cost sources of electrical supply to provide power to the grid in the relevant timeframe.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIG. 14 illustrates a flowchart of an example method for attributing value scores to partitions of an REPP, according to some embodiments.

Figure 1A:
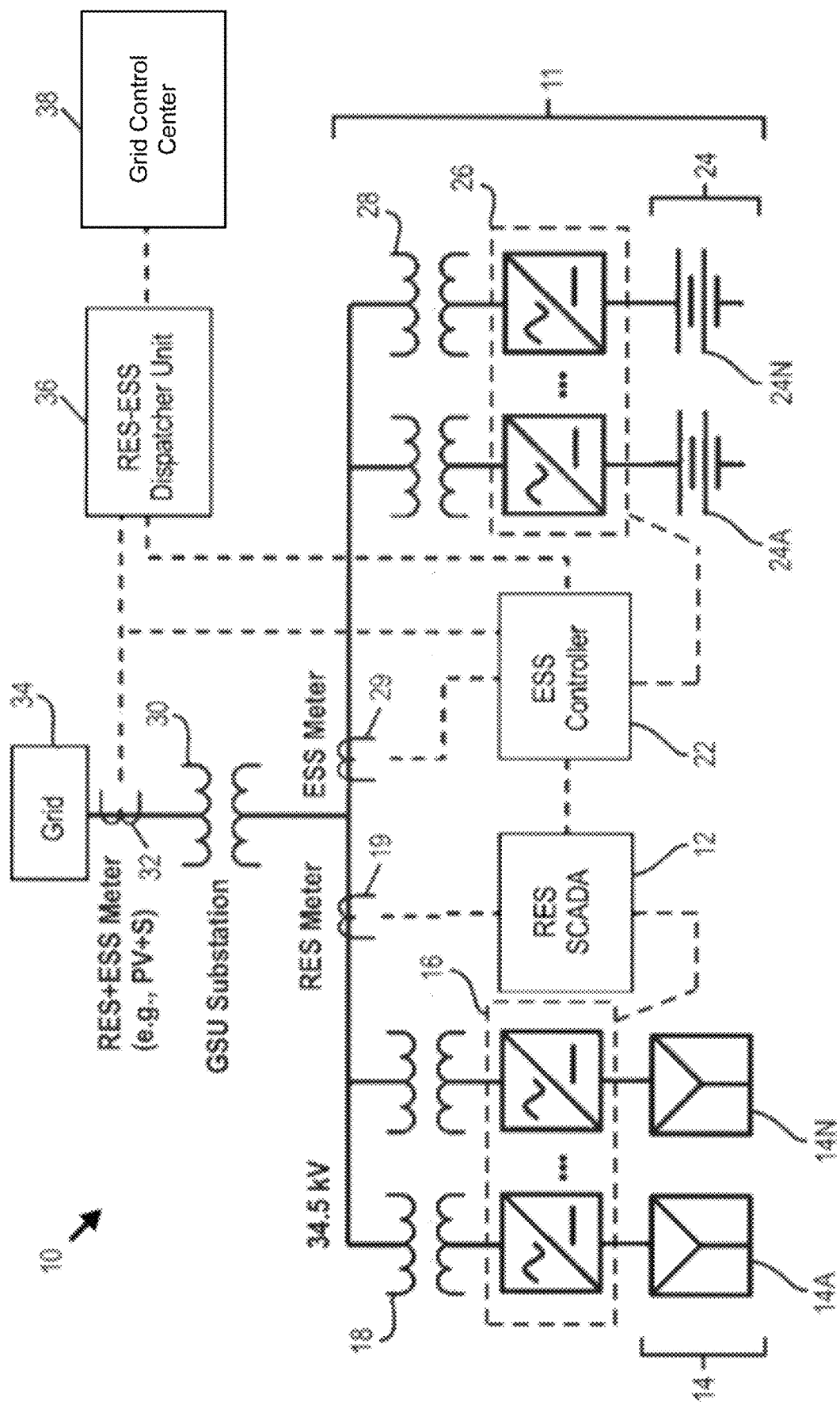
FIG. 1A is a schematic diagram of a metering and control system for controlling a renewable energy source and an energy storage system, according to some embodiments.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Further, in the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

As mentioned above, in some cases, as part of the process of ensuring supply of power or energy to different loads or consumers, a system operator of an energy grid may seek bids from powerplant operators for supply of power to the energy grid. In doing so, the system operator may select the lowest-cost sources of electrical supply to provide power to the grid in the relevant time frames. To account for the system operator's selection process, powerplant operators that supply energy to the grid can develop a method for generating bids for the system operator. A powerplant operator may have a number of considerations when preparing bids for each time frame. These considerations may include, for example, the marginal cost of producing and delivering power, whether the powerplant has a Power Purchase Agreement (PPA) with an offtaker and must ensure it delivers power to the grid at particular times of day to comply with the terms of the PPA, whether the powerplant will be online in any particular time period, and whether the powerplant will need to be operating and delivering power for operational reasons in any time period, etc. Operators of energy storage systems (ESS) may also need to consider whether to charge the ESS from the grid or deliver energy from the ESS to the grid in separate time periods or to wait until a later time to do so.

Bidding strategies for renewable energy powerplant (REPP) operators can depend not only on the goals of the powerplant operators, but also on the specific rules for bidding that can be implemented by the system operator (e.g., the utility system operator, such as an operator of an energy grid). For example, after receiving the bids, a system operator may dispatch any, all, or none of an REPP capacity for the period of time covered by the bid. The REPP operator may have reasons to prefer one outcome over another based on a number of considerations including, for example, whether power was delivered to the grid, how much revenue was generated as a result, any change in ESS state of charge (SOC) resulting from being dispatched or not, operating costs for the REPP, wear and tear on the REPP, etc. With so many considerations to consider, it can be difficult to generate optimal bidding strategies for controlling the REPP (e.g., it can be difficult to generate the optimal bidding strategies for supplying power to the energy grid to meet the energy needs of different consumers, while satisfying varying contractual and operational constraints).

A computer implementing the systems and methods described herein can overcome the aforementioned technical challenges. For example, a computer can be configured to automatically generate bidding strategies for an REPP. To do so, the computer can partition or allocate capacity of the energy storage system (ESS) or the REPP (e.g., the capacity of or energy stored in the ESS in combination with renewable energy generated by or forecast to be generated by renewable energy sources of the REPP) into different partitions of the same or varying sizes (e.g., varying capacities). In some cases, the partitions or allocations can include forecast energy generation by renewable energy sources of the renewable energy powerplant. The computer can generate separate bidding strategies and assign the bidding strategies to different partitions or allocations of the ESS or the REPP. The bidding strategies may include different prices, times, and/or other elements of a bidding strategy to discharge energy to the energy grid or receive energy from the energy grid. The computer can implement the bidding strategies for the partitions or allocations for a defined period of time. At the end of the defined time frames within the period of time, the computer can evaluate performance of the different bidding strategies for the respective time frames. The computer can determine or generate a score for each bidding strategy for a time frame. The computer can adjust the partitions or allocations based on the scores for the bidding strategies that correspond to the partitions or allocations. The computer can continue to discharge energy according to the bidding strategies and the adjusted partitions.

Different methods can be used to define bidding strategies for the partitions. For example, in some embodiments, the bidding strategies can be input by a user or a powerplant operator. In some embodiments, the computer can execute a computer model (e.g., a machine learning model, such as a neural network, random forest, or support vector machine) to determine the bidding strategies for the different allocations or partitions. For example, the computer can generate an input vector (e.g., a feature vector) from the following types of values (e.g., bidding criteria): the marginal cost of producing and delivering power, requirements to deliver power to the grid at particular times of day (for example, to comply with the terms of a PPA), whether the powerplant will be online or offline (e.g., for maintenance) in any particular time period, whether the plant will need to be operating and delivering power for operational reasons in any time period, etc. The computer can execute the computer model, and the computer model can output one or more outputs that can be used to generate a bidding strategy to generate bids for submission to the system operator. The outputs can indicate an amount of energy to discharge from the REPP over time, an amount of energy to charge the ESS of the REPP from the energy grid over time, prices of the energy over time, etc. The computer model can be configured to generate such outputs for a defined number of bidding strategies. The computer can identify the outputs for the different bidding strategies and assign the bidding strategies to different partitions of the REPP.

The computer can evaluate the performance of the different bidding strategies. For example, after assigning the bidding strategies to the different partitions, the computer or a different computer can operate as a controller to discharge or charge the ESS and/or the REPP according to the bidding strategies assigned to the respective partitions (e.g., in response to dispatch instructions issued by the system operator after communication of the bids generated by the bidding strategies assigned to the respective partitions). The computer can evaluate the performance of the different bidding strategies during the execution or use of the bidding strategies. For example, the computer can evaluate the performance of the different bidding strategies according to different performance criteria such as, but not limited to, whether power was delivered to the grid, how much revenue was generated as a result, any change in ESS state of charge (SOC) resulting from being dispatched (or not), operating costs for the REPP, wear and tear on the REPP (such as full or partial cycling of an ESS), the historical volatility of metrics derived from previous bid-dispatch cycles, metrics related to compliance with one or more third-party PPAs, etc. The computer can execute a function, such as a weighted sum or average of the values of the different performance criteria, to determine a score (e.g., a performance score) for each of the bidding strategies. The computer can increase the partition sizes or allocations of bidding strategies with higher scores and decrease the partitions or allocations of bidding strategies with lower scores.

The computer can adjust the allocations or partitions after different bid/dispatch cycles or periodically, based on passage of a specified amount of time, or after a specified number of bid/dispatch cycles. When the computer adjusts the allocations or partitions periodically or from time to time, the scores for each bidding strategy may be aggregated across bid-dispatch cycles, and the aggregated scores may be used to guide the adjustment of allocations.

The computer can continue to adjust the allocations until all the REPP capacity is assigned to one bidding strategy, or the REPP operator may choose to limit the allocations so that there is a minimum and/or maximum allocation to each bidding strategy. For example, by limiting the allocations so that each bidding strategy receives a minimum allocation, the REPP operator can continue to receive information about the performance of each bidding strategy. The computer can adjust allocations more rapidly or more gradually when successive adjustments are in the same direction. The computer can adjust allocations more rapidly when initially moving away from a starting or default allocation. The computer can adjust allocations more gradually as one or more limits are approached.

Renewable Energy Powerplant Control System

Referring now to FIG. 1A, a schematic diagram showing interconnections between various components of an AC coupled metering and control system 10 for controlling a renewable electrical energy generation device 14 including multiple generation units 14A-14N (such as a photovoltaic (PV) array including photovoltaic units) and an energy storage device 24 including multiple energy storage units 24A-24N (such as a battery array including battery units) chargeable with electric power produced by the renewable electrical energy generation device 14 in a RES-ESS facility 11 is shown, according to one embodiment. N can be any number. The N of the multiple generation units 14A-14N can be the same or different from the N of the multiple energy storage units 14A-24N. The RES-ESS facility 11 may combine a renewable electrical energy generation device 14 (e.g., such as an array of PV panels, wind turbines, or the like), and an energy storage device 24 (e.g., an array of lithium-based batteries) that may be coupled to a single substation 30 and/or located in a single property, area, or structure.

FIG. 1A illustrates an RES-ESS facility 11 that uses inverters 16, 26 to convert DC power produced by a renewable electrical energy generation device 14 (e.g., a PV array in certain embodiments) or power released by the energy storage device 24 to AC power for coupling to an AC electrical grid 34. In certain embodiments, the RES-ESS facility 11 may embody a DC coupled RES-ESS facility. In certain embodiments, an energy storage device 24 may include at least one of (or a combination of) energy storage units 24A, 24B using various constructions and chemistries, capacitors, or mechanical energy storage devices such as flywheels or pumped-hydro installations. In certain embodiments, an energy storage device 24 may include at least one electrolysis unit (e.g., configured to electrolyze water to release hydrogen) and a hydrogen storage unit (e.g., adsorbent media for releasably binding hydrogen, hydrogen storage vessels, and/or reversible chemical reactant vessels or beds). In certain embodiments, an energy storage device 24 may include electrical charge storage devices such as batteries, optionally augmented with capacitors.

In certain embodiments, a RES-ESS dispatcher unit 36 has the ability to control the charge or discharge of the energy storage device 24 (e.g., batteries) by communicating with an ESS controller 22. The ESS controller may be located in the RES-ESS facility 11. A RES SCADA (supervisory control and data acquisition) controller 12 may be operatively coupled with RES inverters 16 associated with the renewable electrical energy generation device 14 (optionally embodied in a PV array), and the ESS controller 22 may be operatively coupled with ESS inverters 26 associated with the energy storage device 24. Both the RES SCADA controller 12 and the ESS controller 22 may be in communication with the RES-ESS dispatcher unit 36. In certain embodiments, a utility control center 38 (e.g., of an electric power utility or grid operator) may communicate with the RES-ESS dispatcher unit 36 using DNP3 and set different configuration options. Additionally, the RES-ESS dispatcher unit 36 may receive or generate an accurate renewable generation forecast (e.g., solar generation forecast).

As shown in FIG. 1A, certain embodiments may utilize readily available electric power meters, such as a RES+ESS electrical power meter 32 to measure RES-ESS (e.g., PV+S) facility output, a RES electrical power meter 19 to measure RES output, and an ESS electrical power meter 29 to measure ESS output. Signals from the RES electrical power meter 19 are provided to the RES SCADA controller 12, and signals from the ESS electrical power meter 29 are provided to the ESS controller 22. The electric power generated by the RES-ESS facility 11 may be provided to an electric power system (e.g., an AC electrical grid 34) via a generator step-up (GSU) substation 30 that implements protection and appropriate voltage conversion. RES transformers 18 and ESS transformers 28 may be arranged between the inverters 16, 26, respectively, and the GSU substation 30 to provide voltage conversion utility (e.g., to supply AC power signals to the GSU substation 30 at 34.5 kV in certain implementations). As described herein, "power" may refer to a flow of electrical energy, but in the context of a system operator may also refer to "grid services" which can include, for example, capacity (standby power with various degrees of readiness), or voltage/frequency support (power that can vary very rapidly around an average value).

Figure 1B:
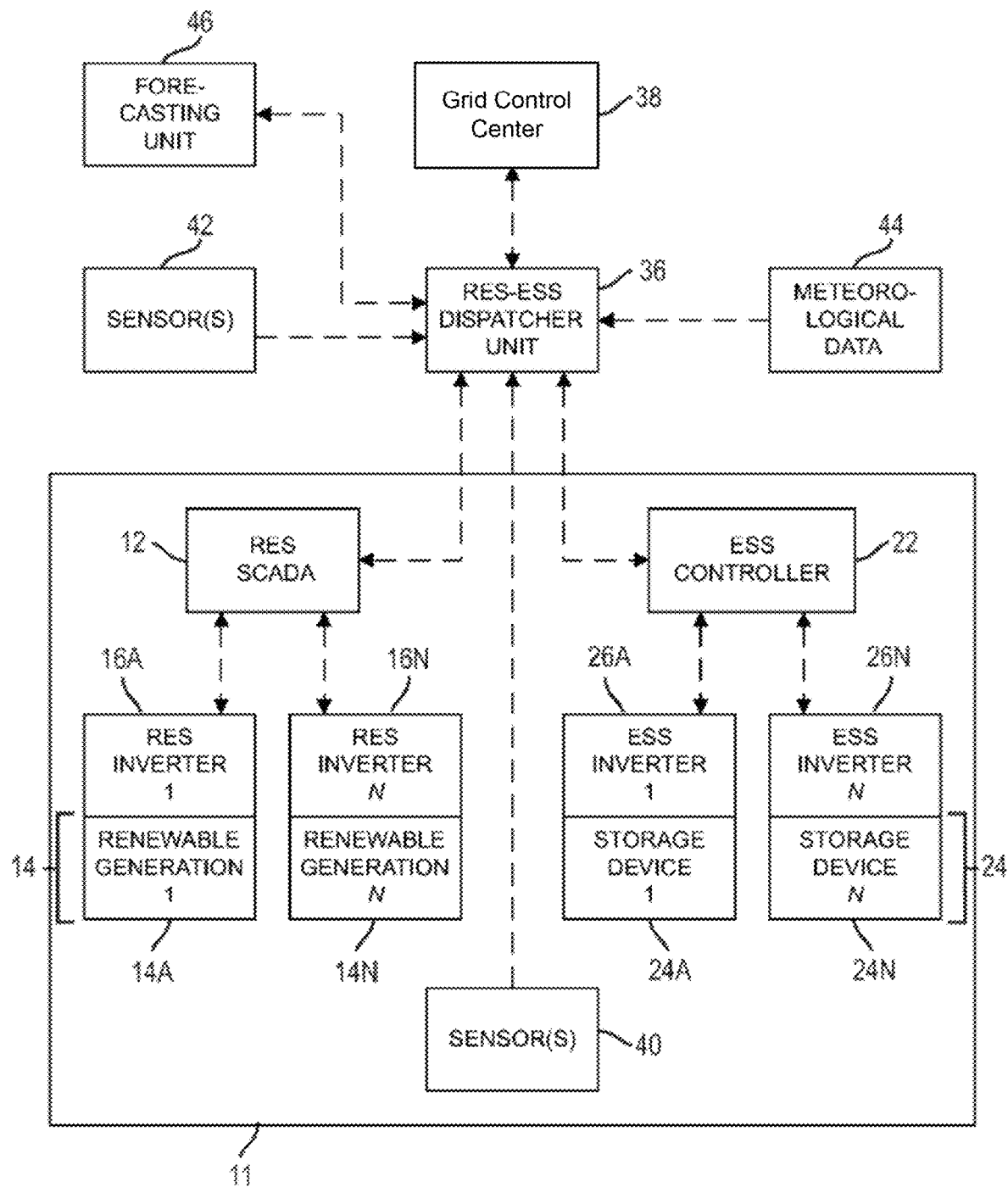
FIG. 1B is a schematic diagram showing certain components of the metering and control system of FIG. 1A, according to some embodiments.

Referring now to FIG. 1B, a schematic diagram showing certain components of the AC coupled metering and control system of FIG. 1A, including interconnection of control- and sensor-related components is shown, according to one embodiment. As shown in FIG. 1B, the RES-ESS dispatcher unit 36 may be arranged between a grid control center 38 and a RES-ESS facility 11. Within the RES-ESS facility 11, a RES SCADA controller 12 may be operatively coupled with RES inverters 16A-16N (wherein N represents any suitable number) that are configured to provide AC conversion of DC power produced by renewable electrical energy generation units 14A-14N (e.g., arrangeable as parts of a renewable electrical energy generation device 14). Similarly, within the RES-ESS facility 11, an ESS controller 22 may be operatively coupled with ESS inverters 26A-26N that are configured to provide AC conversion of DC power supplied by energy storage units 24A-24N (e.g., arrangeable as parts of an energy storage device 24). The RES-ESS facility 11 may further include at least one sensor 40, which may comprise one or more sky imaging sensors useful to determine sky conditions (such as the presence of clouds or lack thereof) proximate to the RES-ESS facility 11, with output signals from the at least one sensor 40 being supplied to the RES-ESS dispatcher unit 36. The RES-ESS dispatcher unit 36 may also receive: (i) signals from one or more sensors 42 (e.g., satellite imaging sensors or the like) not necessarily associated with the RES-ESS facility 11; (ii) meteorological data provided by a meteorological modeling unit 44; (iii) signals from a forecasting unit 46 that may forecast generation by the renewable electrical energy generation device 14 and/or one or more other renewable electrical energy generation devices or units. In certain embodiments, time-dependent forecasting of electrical energy production may be performed by the forecasting unit 46 or may be performed by the RES-ESS dispatcher unit 36. In certain embodiments, a time-dependent forecast of electrical energy production may utilize one, two, or all three of the following: on-site sky imaging provided by the sensor(s) 40, satellite imaging provided by the sensor(s) 42, and meteorological data provided by the meteorological modeling unit 44. In certain embodiments, sensors of other types may be used.

Figure 2:
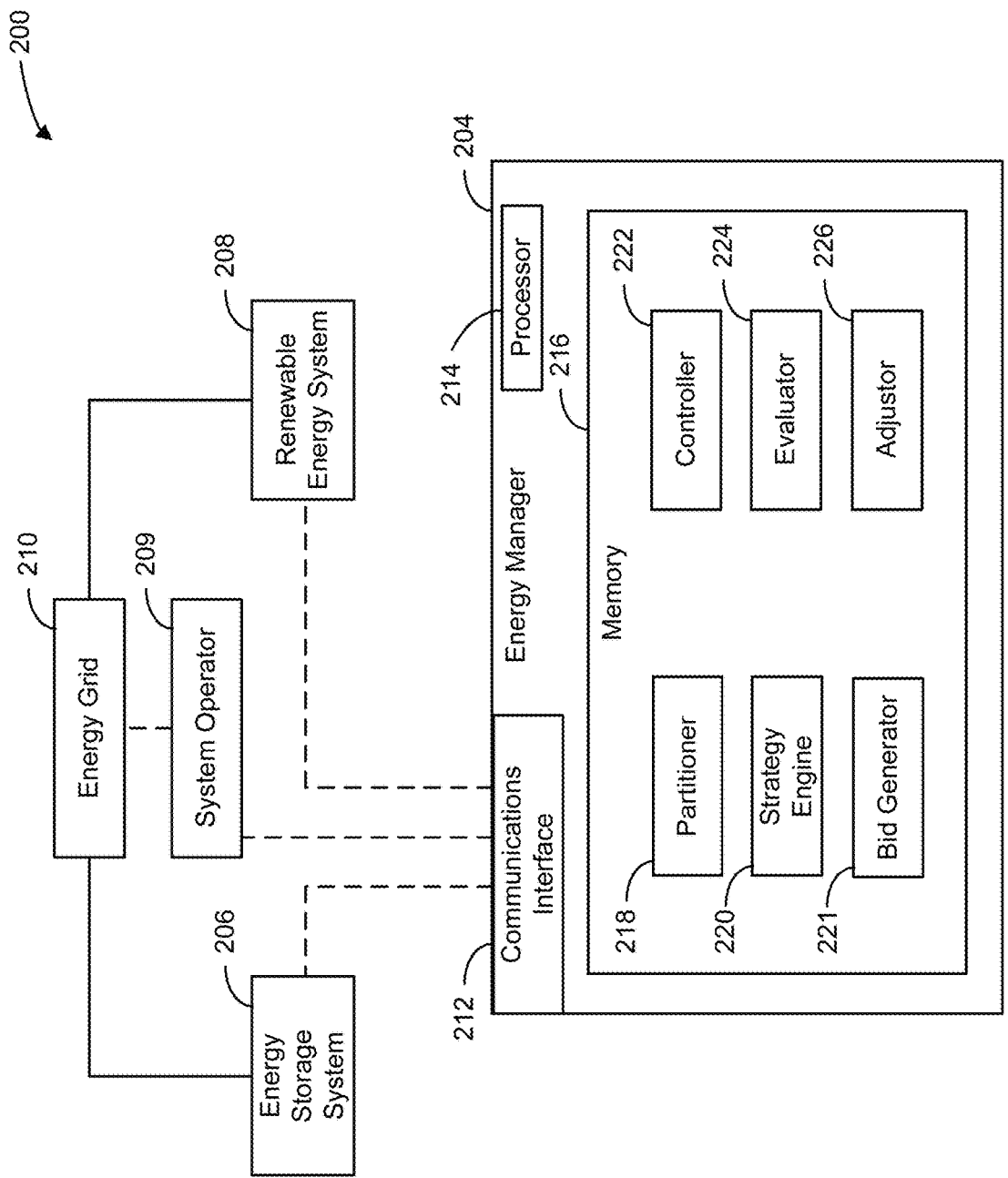
FIG. 2 illustrates an example system for optimizing control of a renewable energy powerplant, according to some embodiments.

Referring now to FIG. 2, a system 200 for optimizing control of a renewable energy powerplant. As described herein, renewable energy facility and renewable energy powerplant are used interchangeably. In brief overview, the system 200 can include an energy manager 204 that communicates with an energy storage system (ESS) 206, a renewable energy source (RES) system 208, and/or an energy grid 210. The energy manager 204 can operate in tandem with the ESS 206 and the RES system 208 to supply energy to the energy grid 210 and to optimize doing so over time. For example, the energy manager 204 can partition the energy capacity of the REPP (e.g., the energy capacity of the ESS and/or the amount of energy that can be generated by the renewable energy sources of the REPP) into different partitions (e.g., allocations of capacity of the REPP) for a time frame. The energy manager 204 can assign a different bidding strategy to each partition for a time period that may begin with the time frame. The energy manager 204 can discharge or charge the REPP according to the bidding strategies (e.g., a set of rules for generating bids intended for controlling the REPP to charge and/or discharge energy from an ESS and/or RES system over a time period) assigned to the partitions for the time period. The energy manager 204 can do so, for example, by discharging energy from the REPP or charging the REPP according to dispatch signals received from a system operator of the energy grid 210 in response to bids generated by or using the bidding strategies. The energy manager 204 can evaluate the performance of each bidding strategy according to different performance criteria to generate a score for each partition and/or the bidding strategy corresponding to the partition. The energy manager 204 can increase the capacities of the partitions with higher scores and decrease the capacities of the partitions with lower scores. The energy manager 204 can repeat the process over time to optimize control of the renewable energy powerplant by allocating the highest capacity to the highest performing bidding strategy as determined by the score for each strategy. The system 200 may include more, fewer, or different components than shown in FIG. 2. For example, there may be any number of client devices or computers that make up or are a part of the energy manager 204 or networks in the system 200. As described herein, solid lines can indicate energy flow between components and dashed lines can indicate communication between components.

Bidding strategies can be any set of rules that the energy manager 204 can use to generate bids to transmit to the system operator 209. One example of a bidding strategy can be to perform operations to generate and/or use a bid for a time window (e.g., a time window of a time period of a bidding strategy). The bidding strategy can involve the operations of (i) determining how much energy the plant could deliver in the time window (e.g., hour) covered by the bid based on a) energy currently stored in the ESS; b) a forecast for how much energy the RES will produce between now and the start of the period covered by the bid; c) a forecast for how much energy the REPP will deliver between now and the start of the period covered by the bid; d) a forecast for how much energy the RES will produce during the period covered by the bid; e) an estimate for the net error in the estimates of energy production and delivery; and f) a power delivery limit of the system (e.g., energy delivered in 1 hour cannot exceed 1 MWh if the system cannot deliver more than 1 MW of power); and (ii) bidding the amount of energy determined in the first operation, at a fixed (e.g., predetermined) price.

Another example of a bidding strategy can be to perform the operations of the first example bid strategy and perform further operations. The second bidding strategy can involve the additional operations of (i) maintaining a table of base bid prices, one for each combination of month and hour-of-day (thus, there may be 288 base bid prices); (ii) maintaining a table of expected deliverable energies, one for each combination of month and period-of-day (thus, there may be 288 expected deliverable energies, if the bid time windows are 1-hour periods, or 1,152 if the bid periods are 15-minute periods); (iii) maintaining a table of adjustments to base bid prices, such that the base bid price is lowered if the forecast deliverable energy for the period to be bid is higher than the expected deliverable energy for the period, and is raised if the forecast deliverable energy for the period to be bid is lower than the expected deliverable energy. To give a specific example, the adjustment may be that the bid price should be doubled if the forecast is half the expected, quadrupled if the forecast is ¼ the expected, and so on; and should be halved if the forecast is double the expected, multiplied by 25% if the forecast is quadruple the expected, and so on; and (iv) bidding the amount of energy determined as described in the first example bidding strategy, at a price set by the base bid price with the appropriate adjustment. These bidding strategies are examples. Any bidding strategy may be used to perform the processes described herein.

The ESS 206 and the RES system 208 may be components of the RES–ESS facility 11. For example, the ESS 206 may be or include the ESS inverters 26A-26N and the energy storage units 24A-24N, shown and described with reference to FIGS. 1A-1B. The energy storage units 24A-24N can be or include batteries or any type of energy storage device. The RES system 208 may be or include the electrical energy generation units 14A-14N and the RES inverters 16A-16N that are configured to provide AC conversion of DC power produced by the electrical energy generation units 14A-14N. The electrical energy generation units 14A-14N can be or include any type of renewable energy generation component, such as devices configured to generate solar energy (e.g., solar panels), wind energy (e.g., windmills), hydro energy, nuclear energy, geothermal energy, etc. Individually or together, the ESS 206 and the RES system 208 can be an REPP.

The energy grid 210 can be any energy grid or utility grid (e.g., the grid 34) that is configured to receive energy from powerplants and discharge the energy to different loads. The energy grid 210 can be controlled and/or managed by a grid or system operator 209. The energy grid 210 can receive energy from different energy sources, such as different powerplants (e.g., renewable energy powerplants), and distribute the energy to different loads. The system operator 209 can receive different bids from the different powerplants that indicate pricing and timing of providing energy from the respective powerplants to the energy grid and/or discharging energy to the respective powerplants.

The system operator 209 can be or include a computing device that is configured to control charging and/or discharging of the energy grid 210. The system operator 209 can receive bids from different powerplants. The bids can indicate time frames and/or time periods to discharge energy to the energy grid 210 from the respective powerplants and/or to discharge energy to the respective powerplants. The system operator 209 can be configured to automatically select which bids to accept using an algorithm (e.g., an optimization algorithm) or upon selection of the bids by a user accessing the system operator 209. The system operator 209 can transmit indications to the computing devices of the different powerplants indicating whether bids proposed by the powerplants are selected. When a powerplant transmits the system operator 209 bids of multiple bidding strategies, the system operator 209 can transmit indications of the bids that are accepted, and/or the bids that are not accepted, if any.

The energy manager 204 can include or execute on one or more processors or computing devices and/or communicate via a network. The network can include computer networks such as the Internet, local, wide, metro, or other area networks, intranets, satellite networks, and other communication networks such as voice or data mobile telephone networks. The network can be used to access information resources such as web pages, websites, domain names, or uniform resource locators that can be presented, output, rendered, or displayed on at least one computing device, such as a laptop, desktop, tablet, personal digital assistant, smartphone, portable computer, or speaker.

The energy manager 204 can include or utilize at least one processing unit or other logic device such as a programmable logic array engine or a module configured to communicate with one another or other resources or databases. The components of the energy manager 204 can be separate components or a single component. The system 200 and its components can include hardware elements, such as one or more processors, logic devices, or circuits.

The energy manager 204 may comprise one or more processors that are configured to control charging and/or discharging of the ESS 206 and/or the RES system 208 to the energy grid 210. The energy manager 204 may comprise a communications interface 212, a processor 214, and/or memory 216. The energy manager 204 may communicate with the ESS 206, the RES system 208, and/or the system operator 209 via the communications interface 212. In some cases, the energy manager 204 may do so via an application programming interface (API). The processor 214 may be or include an ASIC, one or more FPGAs, a DSP, circuits containing one or more processing components, circuitry for supporting a microprocessor, a group of processing components, or other suitable electronic processing components. In some embodiments, the processor 214 may execute computer code or modules (e.g., executable code, object code, source code, script code, machine code, etc.) stored in the memory 216 to facilitate the activities described herein. The memory 216 may be any volatile or non-volatile computer-readable storage medium capable of storing data or computer code.

The memory 216 may include a partitioner 218, a strategy engine 220, a bid generator 221, a controller 222, an evaluator 224, and an adjustor 226. In brief overview, the components 218-226 may cooperate to optimize the bidding strategies to use to provide energy to the energy grid 210. The components 218-226 may partition the capacity of the REPP (e.g., the ESS 206 and/or, in some cases, the RES system 208) into a defined number of partitions or allocations of capacity. The components 218-226 can assign a different bidding strategy to each of the partitions. The components 218-226 can control the REPP according to the bidding strategies (e.g., according to the results of the bidding strategies, such as any dispatch signals the energy manager 204 receives based on bids generated through the bidding strategies) for the different partitions or allocations of capacity. The components 218-224 can evaluate the performance of each of the bidding strategies according to the results of controlling the REPP using the bidding strategies (e.g., using bids generated based on the bidding strategies). The components 218-226 can assign scores to the bidding strategies based on the evaluation. The components 218-226 can increase the allocations (e.g., the capacities) of higher-scoring bidding strategies and decrease the allocations of lower-scoring bidding strategies. The components 218-226 can repeat this process over time to optimize the bidding strategy or bidding strategies to use to discharge energy to the energy grid 210 and/or receive energy from the energy grid 210.

The partitioner 218 may comprise programmable instructions that, upon execution, cause the processor 214 to partition the REPP into different partitions. The partitions can be virtual partitions in which each partition corresponds to a specific capacity of the REPP. The partitioner 218 can be configured to partition the power and/or energy capacity of the REPP for a time period. The energy capacity of the REPP can be a maximum energy capacity of the ESS 206 for the time period, a combination (e.g., a sum) of the maximum energy capacity of the ESS 206 and a forecast energy generation by the RES system 208 for the time period, a stored energy of the ESS 206, or a combination of the stored energy of the ESS 206 and the forecast energy generation by the RES system 208 for the time period. The partitioner 218 can be configured to partition the energy capacity into a defined number of partitions. In doing so, the partitioner 218 can allocate the same capacity to each partition or vary the size of the partitions between the partitions. The partitioner 218 can allocate the capacity to each partition such that a sum of the capacities is equal to 100 percent of the energy capacity of the REPP. The partitioner 218 can partition the capacity into two partitions or into any number of partitions.

In some embodiments, the partitioner 218 can assign ranges to the different partitions. For example, the partitioner 218 can create two partitions and assign a range of 30% to 70% to a first partition and a range of 70% to 30% to a second partition. In another example, the partitioner 218 can assign a range of 0% to 100% to the first partition and a range of 100% to 0% to the second partition. In another example, the partitioner 218 can assign a range of 40% to 50% to the first partition and a range of 60% to 50% to the second partition. The partitioner 218 can assign specific capacities within the ranges of the partitions to the respective partitions. The bounds of the ranges can indicate the maximum and the minimum capacity that can be assigned to the respective partitions such that the capacities of the partitions cannot be adjusted to be outside of the ranges assigned to respective partitions.

The strategy engine 220 may comprise programmable instructions that, upon execution, cause the processor 214 to generate bidding strategies for the partitions of the REPP. Bidding strategies can include rules for generating bids to transmit to the system operator 209 for different time windows, as described herein. The bidding strategies can be or include a charge and/or a discharge schedule indicating when to charge with energy from the energy grid 210 or discharge energy to the energy grid. The bidding strategies can be or include a schedule in which the REPP is configured to be operational or to power off. The bidding strategies can include any elements or features associated with providing energy to the energy grid 210 or receiving energy from the energy grid 210. The bidding strategies can be used to create bids to the system operator 209 for different time frames of the period of time for the bidding strategies. Over the course of the period of time, the energy manager 204 (e.g., via the bid generator 221) can submit bids according to the different bidding strategies for the current time frame and/or for one or more time frames into the future. The system operator 209 can receive such bids and accept or reject the bids. The system operator 209 can transmit a message (e.g., a dispatch signal) to the energy manager 204 indicating which bids are accepted and/or which bids are not accepted (e.g., which bids are selected and/or which bids are not selected). The strategy engine 220 can generate or obtain the bidding strategies by receiving the bidding strategies as an input from a user interface or by executing a computer model that is configured to generate bidding strategies.

For example, the strategy engine 220 can be or include a computer model that is configured to receive input bidding criteria, such as the marginal cost of producing and delivering power to the energy grid 210 at particular times of the day (e.g., to comply with the terms of a power purchase agreement (PPA)), whether the REPP will be online or offline (e.g., for maintenance) in any particular time frame or sub-time frame, whether the REPP will need to be operating and delivering power for operational reasons in any time frame or sub-time frame, etc. The strategy engine 220 can receive such inputs and automatically generate a defined number of bidding strategies that comply with the inputs. The defined number of bidding strategies may be equal to the number of partitions generated by the partitioner 218.

The strategy engine 220 can be or include a computer model that is configured to output elements of a defined number of bidding strategies based on input bidding criteria. In one example, the strategy engine 220 can be or include a machine learning model that is trained to receive bidding criteria as input and output bidding strategies (e.g., features, such as costs or values for different time frames, amount of energy charged or discharged, etc., of bidding strategies) based on the received bidding criteria. The machine learning model can be trained using a supervised training method in which a labeled training data set is input into the machine learning model and the machine learning model is trained according to the labels. For instance, the training data set can be labeled with the ground truth indicating the correct bidding strategy components of a defined number of bidding strategies based on a given set of bidding criteria. The machine learning model may generate an output based on the labeled training data set and the machine learning model may be trained using backpropagation techniques according to a loss function based on a comparison between the output by the machine learning model and the labels. The machine learning model can adjust its internal weights and/or parameters based on the training data set. The machine learning model can be trained over time with different training data sets until the machine learning model has an accuracy exceeding a desired accuracy threshold.

The strategy engine 220 can receive bidding criteria from the system operator 209 of the energy grid 210. In some cases, the strategy engine 220 can receive one or more bidding criteria from the system operator 209, such as requirements to deliver energy to the energy grid 210 at particular times of the day or any other bidding criteria. The strategy engine 220 can retrieve other bidding criteria from memory, such as the marginal cost of producing and delivering energy, an offline schedule indicating times or time frames in which the REPP will be offline (e.g., for maintenance), an operation schedule indicating times or time frames in which the REPP will need to be operating and delivering power, times and/or amount of energy to discharge to supply loads for PPAs, etc. The strategy engine 220 can generate a feature vector from such bidding criteria and execute the machine learning model using the feature vector as input. The machine learning model can output the defined number of bidding strategies based on the feature vector of bidding criteria.

In some cases, instead of or in addition to a machine learning model, the strategy engine 220 can be or include a rule-based model. For example, the strategy engine 220 can include one or more rules, such as if-then statements or a decision tree, that the strategy engine 220 can use to determine the defined number of bidding strategies. The strategy engine 220 can apply the one or more rules to the bidding criteria and output bidding strategies for the different partitions of the REPP.

The controller 222, in some cases in response to receiving dispatch instructions received from the system operator 209 responding to the bids generated (e.g., generated by the bid generator 221) from the outputs of the strategy engine 220, can control charging and/or discharging of the ESS 206 (e.g., charging with energy from the energy grid 210 or discharging energy to the energy gird 210). The bidding strategies may be or include charging or discharging schedules to indicate times and/or time frames for such charging and/or discharging. In some cases, the bidding strategies can indicate values or costs to attribute to the energy being charged from the energy grid 210 to the ESS 206 or discharged from the ESS 206 and/or RES system 208 to the energy grid 210. The values (e.g., prices or costs) can be dynamic and change over the course of the time period for which the bidding strategies were generated.

The bid generator 221 may comprise programmable instructions that, upon execution, cause the processor 214 to generate bids for the different partitions based on the bidding strategies assigned to the partitions. The bid generator 221 can generate and/or transmit bids based on the bidding strategies (e.g., by following the rules of the bidding strategies) for the different partitions over time. For example, the different bidding strategies can indicate different minimum values for different time frames or sub-time frames of the period of time for the bidding strategies. The strategy engine 220 can identify the current time and identify the minimum values associated with the current time for each of the bidding strategies. The bid generator 221 can additionally identify any other data regarding the bid strategies, such as a forecast of how much energy an RES will produce between the current time and the start of the time window covered by the bid, a forecast of how much energy the REPP will generate or deliver between now and the start of the period covered by the bid, a forecast for how much energy the RES will produce during the period covered by the bid, an amount of energy that is currently stored in the ESS of the REPP, an estimate for the net error in such forecasts, a power delivery limit, etc. The bid generator 221 can generate a value for a bid based on such features for each partition. The bid generator 221 can transmit the bids to the system operator 209. In some cases, the bids can include different values for renewable energy than for non-renewable energy. In some cases, the bid generator 221 may generate multiple options for bids using a bidding strategy and a user may select a bid from the options.

The system operator 209 can receive bids from the REPP and any number of other powerplants. The system operator 209 can select (e.g., automatically select using one or more rules) bids from different bidding strategies of different REPPs over time. Because the bid generator 221 can transmit multiple bids for different partitions of the REPP to the system operator 209, the system operator 209 may select all or a portion of the bids transmitted by the strategy engine 220. The system operator 209 can select which of the bids from the bid generator 221 to use for the different time frames or sub-time frames of the time period and transmit indications of the selection (e.g., a dispatch signal) to the energy manager 204.

The controller 222 may comprise programmable instructions that, upon execution, cause the processor 214 to control the ESS 206 and/or the RES system 208 based on bids that were transmitted to the system operator 209 by the strategy engine 220 and selected by the system operator 209. The controller 222 can receive the selection of the bids from the system operator 209. The controller 222 can control the ESS 206 such that the ESS 206 discharges energy to the energy grid 210 and receives energy from the energy grid 210 according to the bids that were selected by the system operator 209. The controller 222 can similarly control discharge of the RES system 208 to the ESS 206 and/or the energy grid 210 according to the bids that were selected by the system operator 209. The controller 222 can control the ESS 206 and the RES system 208 according to dispatch signals from the system operator 209 that the system operator 209 generated based on bids generated by the bid generator 221. The controller 222 can control the ESS 206 and/or the RES system 208 by controlling one or more switches connecting the ESS 206 and/or the RES system 208 to the energy grid 210 to enable charging or discharging of the ESS 206 and/or the RES system 208. The controller 222 can transmit control signals to the ESS 206 to cause charge and/or discharge of the ESS 206 and, in some cases, an amount of energy or power with which to charge and/or discharge. The controller 222 can transmit control signals to the RES system 208 to cause the RES system 208 to discharge energy to the energy grid 210.

In one example, the controller 222 can control the ESS 206 and the RES system 208 according to two bidding strategies for the time period. A first bidding strategy of the two bidding strategies can be assigned to a first partition of the RES by the partitioner 218. A second bidding strategy of the two bidding strategies can be assigned to a second partition of the two bidding strategies. The controller 222 can control the discharge and/or discharge of the ESS 206 and/or the RES system 208 to comply with the requirements of both of the bidding strategies and such that the capacity of each partition is not violated (e.g., the controller 222 does not discharge an amount of energy from one partition that exceeds the capacity allocated to the partition).

As the controller 222 controls the ESS 206 and the RES system 208 according to the bidding strategies selected by the system operator 209, the evaluator 224 can monitor performance of the selected bidding strategies. The evaluator 224 may comprise programmable instructions that, upon execution, cause the processor 214 to monitor and evaluate performance of different bidding strategies. The evaluator 224 can be configured to determine or identify different metrics of performance of the individual bidding strategies, such as whether energy was delivered to the grid, how much revenue was generated, any change in ESS state of charge (SOC) resulting from being dispatched (or not), operating costs for the REPP, wear and tear on the REPP (such as full or partial cycling of an ESS), whether energy was delivered to satisfy the energy needs of PPA counterparties to whom energy deliveries have been committed, the historical volatility of metrics derived from previous bid-dispatch cycles, etc. The evaluator 224 can monitor bidding strategies over the course of the time period in which the bidding strategies are implemented to determine or identify such metrics.

The evaluator 224 can use different methods to determine the metrics for the different bidding strategies. In one example, the evaluator 224 can determine whether energy was delivered to the energy grid 210 for a bidding strategy based upon whether the system operator 209 transmitted an indication that a bid of the bidding strategy was selected or not. In another example, the evaluator 224 can determine whether energy was delivered to the energy grid 210 for the bidding strategy based on whether the bidding strategy indicated to send energy to the energy grid 210 or not.

In another example, the evaluator 224 can determine metrics based on measurements from a meter that indicate how much energy was discharged to the energy grid. For instance, the evaluator 224 can determine an amount of energy that was discharged to the energy grid 210 based on a change in value of a meter measuring the energy traveling to the energy grid 210 from the ESS 206 and/or a meter measuring the energy traveling to the energy grid 210 from the RES system 208. The evaluator 224 can allocate portions of the energy from one or both of the meters to the bidding strategies based on whether the system operator selected a bid for each strategy and based on the capacity size of the partitions associated with the bidding strategies. The evaluator 224 can attribute value components for each bidding strategy based on the amount of energy that was discharged to the energy grid 210 by the partitions associated with each bidding strategy and values or costs associated with such discharge. In some cases, the value may vary over time (e.g., for different time frames within the time period). In such cases, the evaluator 224 can identify the amount of energy discharged for the time frames and calculate the value for each bidding strategy per time frame. The evaluator 224 can aggregate the values of the different time frames for the bidding strategies to determine value scores for the bidding strategies.

The evaluator 224 can determine the change in the ESS state of charge overall and allocate the change to each bidding strategy according to whether the system operator accepted a bid for each strategy and according to the percentage of the maximum capacity of the REPP directed to the bidding strategy. The evaluator 224 can determine operating costs for each bidding strategy according to whether the system operator selected a bid for each strategy and as a function of the percentage of the capacity of the REPP allocated to the respective bidding strategies. For example, the evaluator 224 can store a defined value (e.g., a first defined value) indicating the operating costs of the REPP for the time period. The evaluator 224 can allocate portions of the defined value to the different bidding strategies according to whether the system operator selected a bid for each strategy and as a function of (e.g., multiplied by) the percentage of the capacity of the REPP to determine the operating costs for the respective bidding strategies. The evaluator 224 can similarly calculate the wear and tear of the REPP for each bidding strategy, except the evaluator 224 can use a different defined value (e.g., a second defined value) to do so. The evaluator 224 can determine or identify any number of metrics for bidding strategies of the partitions of the REPP.

In one example, the evaluator 224 can determine a value for the wear and tear each bidding strategy incurred on the ESS of the REPP. A bidding strategy can incur wear and tear on the ESS by causing the ESS to cycle between charging and discharging or not charging or discharging at a high frequency. A bidding strategy can also incur wear and tear on the ESS by causing the ESS to stay at a high state of charge (e.g., full or above a threshold) for large amounts of time (e.g., for an amount of time above a threshold) or the wear and tear can increase the longer the ESS is at the high state of charge. The evaluator 224 can determine a value for the wear and tear for each bidding strategy based on such metrics of the bidding strategies.

In another example, the evaluator 224 can determine a score based on the values the operator assigns to the dispatch signals the system operator 209 transmits to the energy manager 204. The evaluator 224 may do so, for instance, when the system operator 209 transmits a value indicating the amount of energy the system operator 209 will pay for energy without referencing the bid that was accepted. The system operator 209 may send such a signal when a single combined bid is transmitted to the system operator 209 from bids generated using multiple bidding strategies. For example, for a time frame, the different bidding strategies (e.g., bids of the different bidding strategies) may correspond to different minimum values. The system operator 209 can transmit a value to the energy manager 204. The value can be an amount that the system operator 209 will pay based on the bids that the bid generator 221 transmitted to the system operator. The evaluator 224 can compare the value to the minimum values of the bidding strategies for the time frame. The evaluator 224 can determine a value for a value metric (e.g., a price metric or a revenue metric) of the bidding strategies to go to the bidding strategy with the minimum value that is closest to, but does not exceed, the value the system operator 209 transmitted to the energy manager 204. The evaluator 224 can determine the value metric for the bidding strategy with the minimum value closest to the value from the system operator 209 to be proportional to the amount of energy the energy manager 204 discharged to the energy grid 210 for the time frame or sub-time frame of a time frame and the value the system operator 209 transmitted to the energy manager 204 and/or the minimum value of the bidding strategy. The evaluator 224 may assign a zero to the same metric for each other bidding strategy for the time frame or sub-time frame. When the evaluator 224 determines such values for sub-time frames of a time frame, the evaluator 224 can aggregate the value metrics over the sub-time frames for each bidding strategy to determine the aggregate value metrics for the bidding strategies. The evaluator 224 can use the aggregate value metrics and/or value metrics to determine a score for the different bidding strategies for the time frame.

The evaluator 224 can determine a value metric for partitions based on receiving a price or a revenue that is selected or requested by the system operator 209. For example, the evaluator 224 can determine a value metric based on receipt of a price value. The evaluator 224 may receive the price value in dispatch instructions from the system operator 209. The evaluator 224 may determine that all of the bids that have a lower price than the received price from the system operator 209 are accepted. The evaluator 224 can determine the amount of energy that was discharged for each accepted bid. The evaluator 224 can determine the price value metric for partitions for individual sub-time frames of a time frame or a time frame itself, as described above, to be the price of the bid multiplied by the amount of energy that was discharged for the bids of the partitions during the respective sub-time frames or the time frame. In another example, the evaluator 224 may determine a value metric based on receipt of a revenue value. The evaluator 224 may receive the revenue value in dispatch instructions from the system operator 209. The evaluator 224 can determine accepted or selected bids by ranking the bids by the prices of the bids and determining a number of bids that have to be accepted to reach the received revenue (e.g., starting from the bids with the highest price or starting with the lowest price of the bids) based on the prices and discharged energy of the respective bids. In doing so, there might be one bid (e.g., the one with the highest price when selecting bids starting with the lowest priced bids or the one with the lowest price when selecting bids starting with the highest priced bids) that was only partially dispatched. The evaluator 224 can determine the amount of energy that was discharged for each accepted bid. The evaluator 224 can determine the price value metric for partitions for individual sub-time frames of a time frame or a time frame itself, as described above, to be the price of the accepted bids multiplied by the amount of energy that was discharged for the bids of the partitions during the respective sub-time frames or the time frame.

The evaluator 224 can determine scores for the bidding strategies based on metrics for the respective bidding strategies. For example, the evaluator 224 can determine values for the different metrics as described above for each bidding strategy. The evaluator 224 can determine a score for each bidding strategy as a function of the values for the metrics for the bidding strategy. For example, the evaluator 224 can determine an average or a sum of the values for the metrics for a bidding strategy to determine the score for the bidding strategy. In some embodiments, the evaluator 224 can assign weights to the different metrics and calculate or determine a weighted average or a weighted sum to determine the score for the bidding strategy. The evaluator 224 can determine the score for the bidding strategy using any function. The evaluator 224 can use the same function to determine the scores for each bidding strategy that the controller 222 used to control the ESS 206 and/or the RES system 208.

The adjustor 226 may comprise programmable instructions that, upon execution, cause the processor 214 to adjust allocations of capacity of the different partitions. The adjustor 226 can be configured to adjust the allocations of capacity of the different partitions based on the scores for the bidding strategies associated with the partitions that are determined by the evaluator 224. For example, the evaluator 224 can determine a first score for a first partition of the REPP and a second score for a second partition of the REPP. The adjustor 226 can compare the first score with the second score. Responsive to the first score exceeding the second score, the adjustor 226 can increase the capacity of the first partition associated with the first score and decrease the capacity of the second partition associated with the second score. The adjustor 226 can increase the capacity of the first partition by a defined amount and decrease the capacity of the second partition by the defined amount. The adjustor 226 can change the capacities of the partitions such that the sum of the capacities of the partitions is equal to the maximum capacity of the REPP or another defined capacity less than the maximum capacity of the REPP less than the minimum capacity of the REPP.

The adjustor 226 can determine increases and decreases for the partitions based on the scores the evaluator 224 determines for the partitions. For example, the adjustor 226 can determine higher increases and decreases for a higher difference in the first score and the second score when there are two partitions. When there are more than two partitions, the adjustor 226 can determine an average or median of the scores for the partitions and determine increases or decreases for the partitions based on a difference between the scores for the partitions and the average or median. The adjustor 226 can determine increases or decreases for the partitions based on the scores for the partitions using any function or rule. In doing so, the adjustor 226 can cause a sum of the capacities not to exceed a maximum capacity of the REPP, a defined percentage of the maximum capacity, or a defined capacity.

The adjustor 226 can use any set of rules to determine the amount to increase or decrease capacities of the partitions. For example, the adjustor 226 can use the methods described with respect to FIG. 6 and FIG. 7. In some cases, the adjustor 226 can determine increases based on increases or decreases of historical cycles (e.g., dispatch cycles). For example, the adjustor 226 for each time frame for which the adjustor 226 determines and increase or decrease for the partitions, the adjustor 226 can identify the immediately previous adjustments the adjustor 226 performed on the partitions. The adjustor 226 can determine and apply higher increases or decreases for successive increases or decreases across time frames, apply gradually lower increases or decreases for successive increases or decreases, apply higher increases for sudden changes in direction, etc. The adjustor 226 can apply any such rules to determine increases or decreases for the capacities of partitions.

The controller 222 can control the ESS 206 and the RES system 208 based on the adjusted capacities of the partitions. For example, the bidding strategies for the first partition and the second partition can indicate to discharge different percentages of the capacity of energy of the ESS 206. Because the adjustor 226 may have increased the capacity of the first partition and decreased the capacity of the second partition, following the bidding strategies may increase the amount of energy that the controller 222 discharges from the first partition and decrease the amount of energy that the controller 222 discharges from the second partition.

The evaluator 224 can evaluate the performance of the bidding strategies under the adjusted capacities. For example, the evaluator 224 can determine metrics for the bidding strategies based on the controller 222 controlling the ESS 206 and the RES system 208 for a second time frame according to the adjusted capacities for the partitions associated with the bidding strategies. The evaluator 224 can determine scores for the bidding strategies based on the determined metrics using the systems and methods described herein. The adjustor 226 can compare the scores and adjust the capacities of the partitions based on the scores. The evaluator 224, the controller 222, and/or the adjustor 226 can repeat the process any number of times for a defined number of time frames or until the duration of the period of time of the bidding strategies ends.

The evaluator 224, the controller 222, and/or the adjustor 226 can repeat the process until a single partition is allocated the entire capacity of the REPP (e.g., all of the energy in the ESS and/or all of the energy the RES system 208 was or is forecast to generate for the time of the bidding strategies). For example, the adjustor 226 may continue to increase the capacity of one partition while decreasing the capacities of other partitions over multiple iterations of the controller 222 controlling the ESS 206 and the RES system 208 and the evaluator 224 determining scores for the partitions based on the control. Eventually, the adjustor 226 may adjust the capacities of each partition to be zero except for one partition, which may have a capacity of 100% percent of the REPP. Upon doing so, the controller 222 may control the ESS 206 and/or the RES system 208 according to the bidding strategy associated with the maximum capacity and the process of evaluating and adjusting the capacities of the partitions may end. Accordingly, the capacities of the partitions can converge until the controller 222 controls the ESS 206 and the RES system 208 according to the optimal bidding strategy.

In some cases, the adjustor 226 can implement limits or bounds to the capacities of the different partitions. For example, the adjustor 226 or the partitioner 218 can assign boundaries to the different partitions. The bounds may be, for example, 40% to 60%, 20% to 80%, 30% to 70%, or bounds of any other range. When increasing or decreasing capacities for the different partitions, the adjustor 226 can compare the results of the increases or decreases to the bounds associated with the partitions. Responsive to determining an increase that causes the capacity of a partition to exceed the upper bound of the partition or that a decrease causes the capacity of a partition to be less than the lower bound of the partition, the adjustor 226 may cause the increase to cause the capacity to be at the upper bound or the decrease to cause the capacity to be at the lower bound. Accordingly, the adjustor 226 can avoid causing a capacity of a partition from ever reaching zero or 100% of the capacity of the REPP. In doing so, the adjustor 226 can enable the process of evaluating, adjusting, and controlling by the evaluator 224, the adjustor 226, and the controller 222 to continue for the duration of the time period of bidding strategies instead of ending when a capacity of one partition reaches the capacity of the REPP.

In some embodiments, an increase or decrease of a partition to a bound can cause the adjustor 226 to change adjustments to other partitions. For example, the adjustor 226 may determine an increase of a capacity for a first partition to be higher than the upper bound for the first partition. The adjustor 226 can therefore increase the capacity for the first partition to the upper bound. To make sure the capacities of the partitions do not exceed the maximum capacity of the REPP, the adjustor 226 can reduce the reduction in capacity of the other partitions (e.g., reduce the reduction in a second partition) of the REPP by a difference between the upper bound and what the capacity of the first partition would have been without the upper bound. The adjustor 226 can similarly increase the increases of partitions in response to adjusting a partition to the lower bound of a partition.

In some embodiments, the adjustor 226 can randomly (e.g., pseudo-randomly) adjust the partitions during the period of time. For example, during the period of time, the adjustor 226 can increase and/or decrease the capacities of the partitions at different points in time. The adjustor 226 can do so by a defined amount at each instance or by a varying amount at each instance. The adjustor 226 can increase and/or decrease the capacities of the partitions without regard to any scores for the partitions or the performance of the difference in bidding strategies. By doing so, the adjustor 226 can avoid causing the capacities of the partitions to converge to a local maximum. A local maximum is a set of allocations from which the adjustor 226 would make no further adjustments, but which is not the optimal set of allocations. The random adjustments can create opportunities for the adjustor 226 to perform subsequent adjustments that will generate better results than those obtained at the local maximum.

In some embodiments, the adjustor 226 can randomly (e.g., pseudo-randomly) reset the partitions during (e.g., in the middle before the end) the period of time. For instance, during the period of time, the adjustor 226 can reset the partitions to have the capacities that the partitions had before any adjustments were made to the capacities of the partitions. The adjustor 226 can do so regardless of any scores for the partitions. The adjustor 226 can reset the partitions to any defined values, in some case to values that are specific to the partitions. For example, a period of time for generated bidding strategies may be a year. The adjustor 226 can reset the partitions to defined starting allocations at the beginning of each month. The adjustor 226 may adjust the capacities of the partitions on a weekly basis before resetting to the defined starting allocations for each month over the course of the year. Thus, the adjustor 226 can take different seasons or external factors that change with time into account when determining optimal bidding strategies.

In some embodiments, bidding strategies may be added to, removed from or replaced in the set of strategies available to the strategy engine 220. To do so, the adjustor 226 or the strategy engine 220 can reset the capacities of the partitions of the remaining bidding strategies to a default value, reset the capacities to make a minimum allocation (e.g., a defined minimum allocation) to a newly added bidding strategy, or reset the capacities to reallocate the capacity from a partition of a removed bidding strategy to the partitions associated with the remaining bidding strategies. Such additions, removals, or replacements of bidding strategies may be input by a user and/or automatically responsive to a condition being satisfied (e.g., responsive to determining none of the scores for a time frame exceed a minimum score threshold).

Figure 3A:
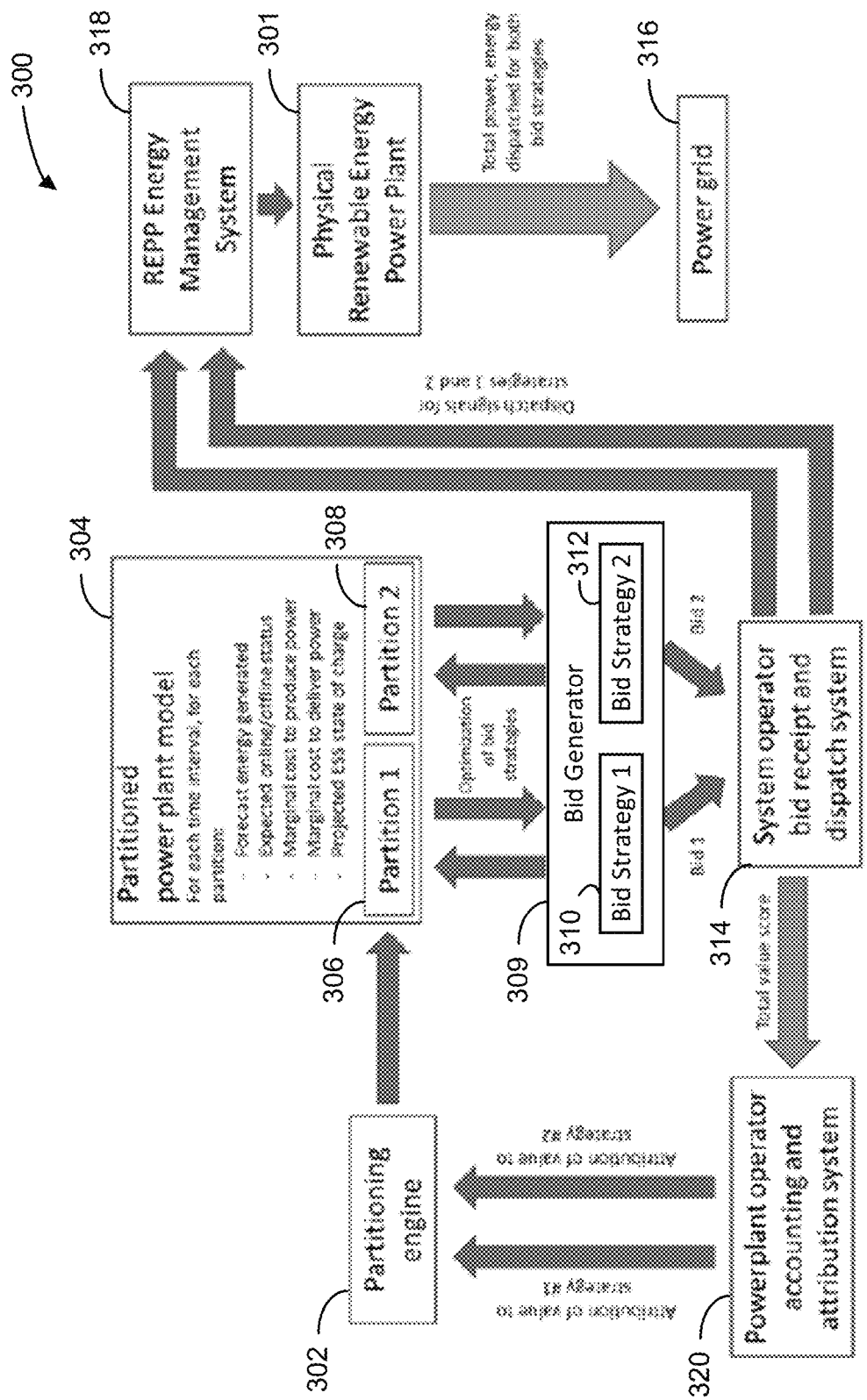
FIG. 3A illustrates an example flow diagram for optimizing control of a renewable energy powerplant, according to some embodiments.

FIG. 3A illustrates an example flow diagram 300 for optimizing control of a renewable energy powerplant, according to some embodiments. The operations depicted in the flow diagram 300 can be performed by a data processing system (e.g., a controller, the RES–ESS dispatcher unit 36, the ESS controller 22, the RES SCADA controller 12, the computing device 1500, the energy manager 204, etc.). In some embodiments, the data processing system is the controller of a renewable energy plant (REPP) 301 that contains an ESS (e.g., the ESS 206) and an RES system (RES system 208). The data processing system may be configured to control energy charge and/or discharge of the ESS and the RES system. The data processing system can do so based on bidding strategies that the data processing system implemented within the REPP 301.

For example, a partitioning engine 302 of the data processing system can partition the REPP 301 into at least two partitions. The partitioning engine 302 can be the same as or similar to the partitioner 218, shown and described with reference to FIG. 2. The partitioning engine 302 can partition the REPP 301 into separate partitions that each has its own capacity of the REPP 301. In partitioning the REPP 301, the partitioning engine 302 can generate a partitioned powerplant model 304. The partitioning engine 302 can generate the partitioned powerplant model to have at least a first partition 306 and a second partition 308. Each partition can include values for different time intervals such as forecast energy generated, expected online/offline status, marginal cost to produce power, marginal cost to deliver power, projected ESS state of charge, etc. The data processing system (e.g., via the strategy engine 220) can input values for the partitions into a bid generator 309. The bid generator 309 can contain rules or modules for a first bidding strategy 310 and a second bidding strategy 312. The first bidding strategy 310 may correspond with (e.g., be assigned to) the first partition 306. The second bidding strategy 312 may correspond with (e.g., be assigned to) the second partition 308. The bid generator 309 can execute the first bidding strategy 310 and the second bidding strategy 312 based on the input values to generate a bid for each bidding strategy 310 and 312. The bid generator 309 can transmit the bids to a system operator bid receipt and dispatch system 314. The bid generator 309 can similarly generate bids using the bidding strategy 310 and the bidding strategy 312 at different times for the period of time.

The system operator bid receipt and dispatch system 314 can determine which of the bids, if any, to use to provide energy to a power grid 316. The system operator bid receipt and dispatch system 314 can select each of the bids of the bidding strategies 310 and 312. Based on the selection, the system operator bid receipt and dispatch system 314 can transmit dispatch signals to an REPP energy management system 318 of the data processing system. The REPP energy management system 318 can include one or more processors or can include executable code configured to manage charging and/or discharging of the ESS and/or the RES system of the REPP 301. The REPP energy management system 318 can control the ESS and/or the RES system of the REPP 301 to dispatch energy or power to the power grid 316 according to and by aggregating both of the selected bids generated using the bidding strategies 310 and 312.

Based on the dispatch of the power or energy to the power grid 316 according to the dispatch signals from the system operator bid receipt and dispatch system 314, the data processing system can determine (e.g., via the evaluator 224) a total value score for the dispatch. The data processing system can determine the total value score for the dispatch according to any combination of the following metrics: whether energy was delivered to the grid, how much revenue was generated, any change in ESS state of charge (SOC) resulting from power or energy being dispatched (or not), operating costs for the REPP 301, wear and tear on the REPP 301 (such as full or partial cycling of an ESS), the historical volatility of metrics derived from previous bid-dispatch cycles, etc. The data processing system can use a function of the values for such metrics such as calculating an average, a sum, a weighted average, or a weighted sum of the values for the metrics. In some cases, the system operator bid receipt and dispatch system 314 can determine (e.g., in the same or a different manner) the total value score for the dispatch and transmit the total value score to the data processing system.

A powerplant operator account and attribution system 320 of the data processing system can be configured to determine scores for the individual bidding strategies. The scores for the individual bidding strategies can indicate how the bidding strategies performed during dispatch of the bidding strategies for a time frame. The powerplant operator accounting and attribution system 320 can include one or more processors or can include executable code configured to determine performance values for individual bidding strategies. The powerplant operator accounting and attribution system 320 can determine such performance values based on the total value score and the capacities that the partitioning engine 302 assigned to the partitions 306 and 308. For example, the powerplant operator accounting and attribution system 320 can determine a percentage of the total value score for which each bidding strategy is responsible. The powerplant operator accounting and attribution system 320 can determine such a percentage based on the amount of each metric for which each of the partitions 306 and 308 is responsible. The powerplant operator accounting and attribution system 320 can multiply the percentages by the total value score to determine an unadjusted score for each of the partitions 306 and 308. The powerplant operator accounting and attribution system 320 can multiply the unadjusted scores for each partition 306 and 308 by the capacity percentage of the partition compared with the total capacity (e.g., energy capacity) of the REPP 301 to normalize the unadjusted scores. Doing so can avoid a bidding strategy receiving a score just because the bidding strategy corresponds to a partition with a larger capacity. The powerplant operator accounting and attribution system 320 can transmit the scores for each partition 306 and 308 to the partitioning engine 302.

The partitioning engine 302 can use the scores of the partitions 306 and 308 to determine adjustments for the capacities of the partitions 306 and 308. For example, the partitioning engine 302 can compare the scores for the partitions 306 and 308. The partitioning engine 302 can increase the capacity of the partition 306 or 308 with the higher score based on the comparison and decrease the capacity of the other partition 306 or 308. The REPP energy management system 318 can subsequently dispatch power or energy to the power grid 316 based on the updated capacities. The system operator bid receipt and dispatch system 314, the powerplant operator accounting and attribution system 320, and the partitioning engine 302 can repeat the process of generating a score for each of the bidding strategies based on the updated partitions 306 and 308 to update the partitions 306 and 308 a second time. The system can repeat the process for a length of a time period for bids generated using the bidding strategies 310 and 312, for a set period of time, or indefinitely.

In implementing the sequence of the flow diagram 300, the systems and methods described herein can allow the reward distribution of each bidding strategy to vary over time, which can be helpful because determining bidding strategy bids can often rely on the needs of the grid and grid's end users, as well as the available supply of energy and power capacity, which may vary over time. Because the reward distributions of the various bidding strategies may vary over time in this application, the chosen methodology should not converge on a single preferred bidding strategy. Instead, capacities of different partitions may vary over time to allow the data processing system (e.g., via the partitioning engine 302) to gather the information needed to respond appropriately should one bidding strategy begin to outperform the previously preferred bidding strategy as circumstances change.

Figure 3B:
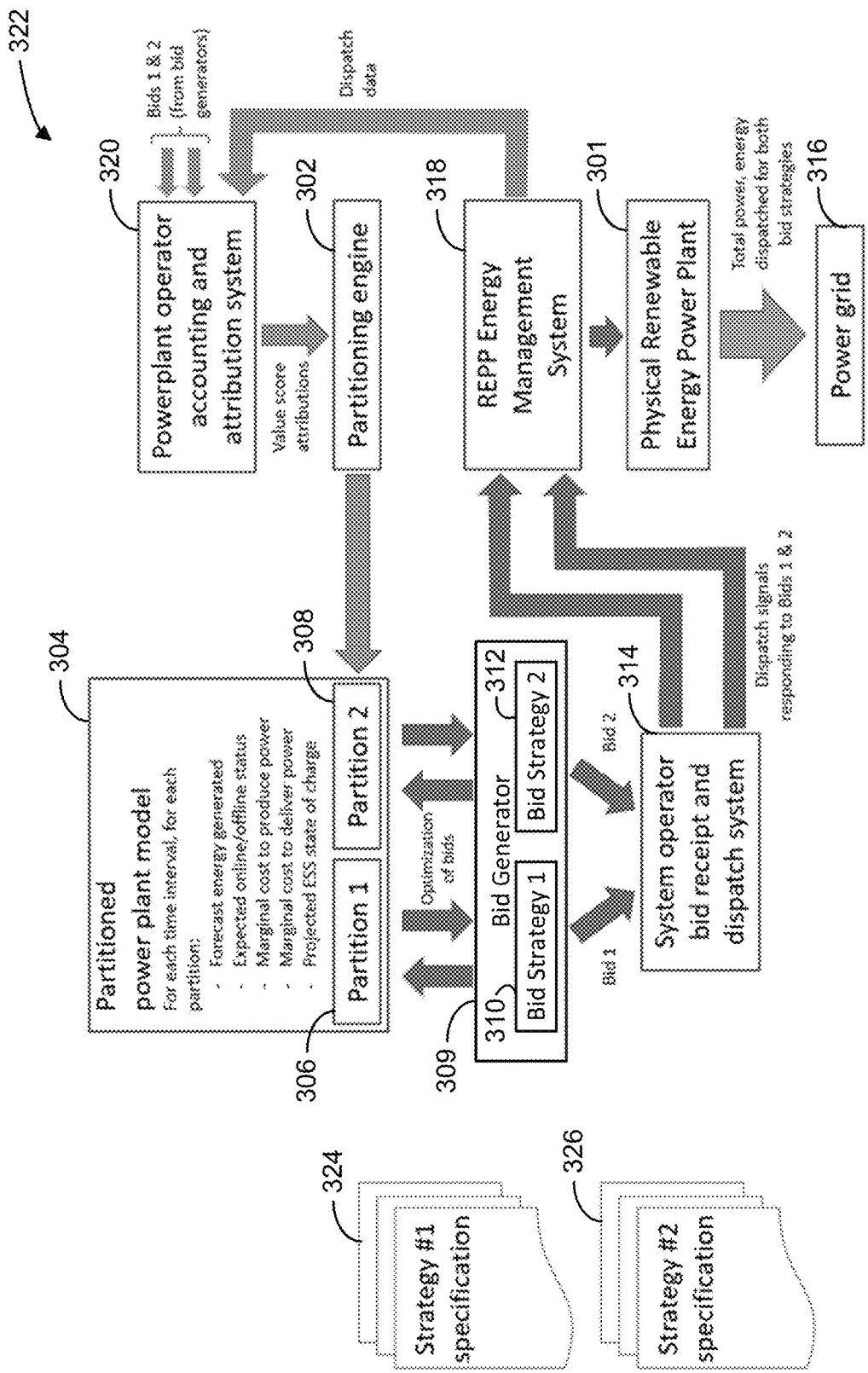
FIG. 3B illustrates an example flow diagram for optimizing control of a renewable energy powerplant, according to some embodiments.

FIG. 3B illustrates an example flow diagram 322 for optimizing control of a renewable energy powerplant, according to some embodiments. The operations depicted in the flow diagram 322 can be performed by a data processing system (e.g., a controller, the RES–ESS dispatcher unit 36, the ESS controller 22, the RES SCADA controller 12, the computing device 1500, the energy manager 204, etc.). In some embodiments, the data processing system is the controller of a renewable energy plant (REPP) that contains an ESS (e.g., the ESS 206) and an RES system (RES system 208). The components shown in FIG. 3B can be the same components or similar components to the components shown in FIG. 3A. The data processing system may be configured to control energy charge and/or discharge of the ESS and the RES system. The data processing system can do so based on bidding strategies that the data processing system implemented within the REPP 301.

The operations depicted in the flow diagram 322 can be similar to the operations depicted in the flow diagram 300. For example, a partitioning engine 302 of the data processing system can partition the REPP 301 into at least two partitions. The partitioning engine 302 can be the same as or similar to the partitioner 218, shown and described with reference to FIG. 2. For example, a partitioning engine 302 of the data processing system can partition the REPP 301 into at least two partitions. The partitioning engine 302 can be the same as or similar to the partitioner 218, shown and described with reference to FIG. 2. The partitioning engine 302 can partition the REPP 301 into separate partitions that each has its own capacity of the REPP 301. In partitioning the REPP 301, the partitioning engine 302 can generate a partitioned powerplant model 304. The partitioning engine 302 can generate the partitioned powerplant model to have at least the first partition 306 and the second partition 308.

Each partition can include assigned values for different time intervals such as forecast energy generated, expected online/offline status, marginal cost to produce power, marginal cost to deliver power, projected ESS state of charge, etc. The data processing system (e.g., via the strategy engine 220) can input values for the partitions into the bid generator 309.

The bid generator 309 can contain rules or modules for a first bidding strategy 310 and a second bidding strategy 312 that indicate how to generate bids for the partitions. The bid generator 309 can generate such bids based on the assigned values to the partitions for an upcoming time window. The first bidding strategy 310 may include one or more rules of a strategy specification 324. The second bidding strategy 312 may include one or more rules of a strategy specification 326. The first bidding strategy 310 may correspond with the first partition 306. The second bidding strategy 312 may correspond with the second partition 308. The bid generator 309 can execute the first bidding strategy 310 and the second bidding strategy 312 based on the assigned values to generate a bid for each bidding strategy. The bid generator 309 can transmit the bids to the system operator bid receipt and dispatch system 314. The bid generator 309 can similarly generate bids using the bidding strategy 310 and the bidding strategy 312 at different times for the period of time.

The system operator bid receipt and dispatch system 314 can determine which of the bids, if any, to use to provide energy to a power grid 316. The system operator bid receipt and dispatch system 314 can select each of the bids of the bidding strategies 310 and 312. Based on the selection, the system operator bid receipt and dispatch system 314 can transmit dispatch signals to an REPP energy management system 318 of the data processing system. The REPP energy management system 318 can include one or more processors or can include executable code configured to manage charging and/or discharging of the ESS and/or the RES system of the REPP 301. The REPP energy management system 318 can control the ESS and/or the RES system of the REPP 301 to dispatch energy or power to the power grid 316 according to and by aggregating both of the selected bids generated using the bidding strategies 310 and 312.

The REPP energy management system 318 can generate and transmit dispatch data to the powerplant operator accounting and attribution system 320. The dispatch data can indicate amounts of power or energy the REPP 301 discharged to the power grid 316 and/or charged with from the power grid 316. The REPP energy management system 318 can also indicate the types of energy (e.g., renewable energy or non-renewable energy) that the REPP 301 directs to the power grid 316. The REPP energy management system 318 can determine such data based on the source (e.g., the ESS of the REPP 301 or an RES of the REPP 301). The REPP energy management system 318 can include values indicating the costs of the energy received from the power grid 316 and/or discharged to the power grid 316. The REPP energy management system 318 can assign timestamps to the amounts to indicate when the energy was directed to the power grid 316 and/or received from the power grid 316. The REPP energy management system 318 can generate and transmit such data for both of the bid strategies 310 and 312 to the powerplant operator account and attribution system 320.

Based on the dispatch data received from the REPP energy management system 318, the powerplant operator accounting and attribution system 320 can determine a total value score for each of the bid strategies 310 and 312. The powerplant operator accounting and attribution system 320 can do so according to any combination of the following metrics: whether energy was delivered to the grid, how much revenue was generated, any change in ESS state of charge (SOC) resulting from power or energy being dispatched (or not), operating costs for the REPP 301, wear and tear on the REPP 301 (such as full or partial cycling of an ESS), the historical volatility of metrics derived from previous bid-dispatch cycles, etc. The powerplant operator accounting and attribution system 320 can use a function of the values for such metrics such as calculating an average, a sum, a weighted average, or a weighted sum of the values for the metrics.

The powerplant operator accounting and attribution system 320 of the data processing system can be configured to determine scores for the individual bidding strategies. The scores for the individual bidding strategies can indicate how the bidding strategies performed during dispatch of the bidding strategies for a time frame. The powerplant operator accounting and attribution system 320 can determine such performance values based on the total value score and the capacities that the partitioning engine 302 assigned to the partitions 306 and 308. For example, the powerplant operator accounting and attribution system 320 can determine a percentage of the total value score for which each bidding strategy is responsible. The powerplant operator accounting and attribution system 320 can determine such a percentage based on the amount of each metric for which each of the partitions 306 and 308 is responsible. The powerplant operator accounting and attribution system 320 can multiply the percentages by the total value score to determine an unadjusted score for each of the partitions 306 and 308. The powerplant operator accounting and attribution system 320 can multiply the unadjusted scores for each partition 306 and 308 by the capacity percentage of the partition compared with the total capacity (e.g., energy capacity) of the REPP 301 to normalize the unadjusted scores. Doing so can avoid a bidding strategy receiving a score just because the bidding strategy corresponds to a partition with a larger capacity. The powerplant operator accounting and attribution system 320 can transmit the scores for each partition 306 and 308 to the partitioning engine 302.

The partitioning engine 302 can use the scores of the partitions 306 and 308 to determine adjustments for the capacities of the partitions 306 and 308. For example, the partitioning engine 302 can compare the scores for the partitions 306 and 308. The partitioning engine 302 can increase the capacity of the partition 306 or 308 with the higher score based on the comparison and decrease the capacity of the other partition 306 or 308. The REPP energy management system 318 can subsequently dispatch power or energy to the power grid 316 based on the updated capacities. The system operator bid receipt and dispatch system 314, the powerplant operator accounting and attribution system 320, and the partitioning engine 302 can repeat the process of generating a score for each of the bidding strategies based on the updated partitions 306 and 308 to update the partitions 306 and 308 a second time. The system can repeat the process for a length of a time period for bids generated using the bidding strategies 310 and 312, for a set period of time, or indefinitely.

Figure 4:
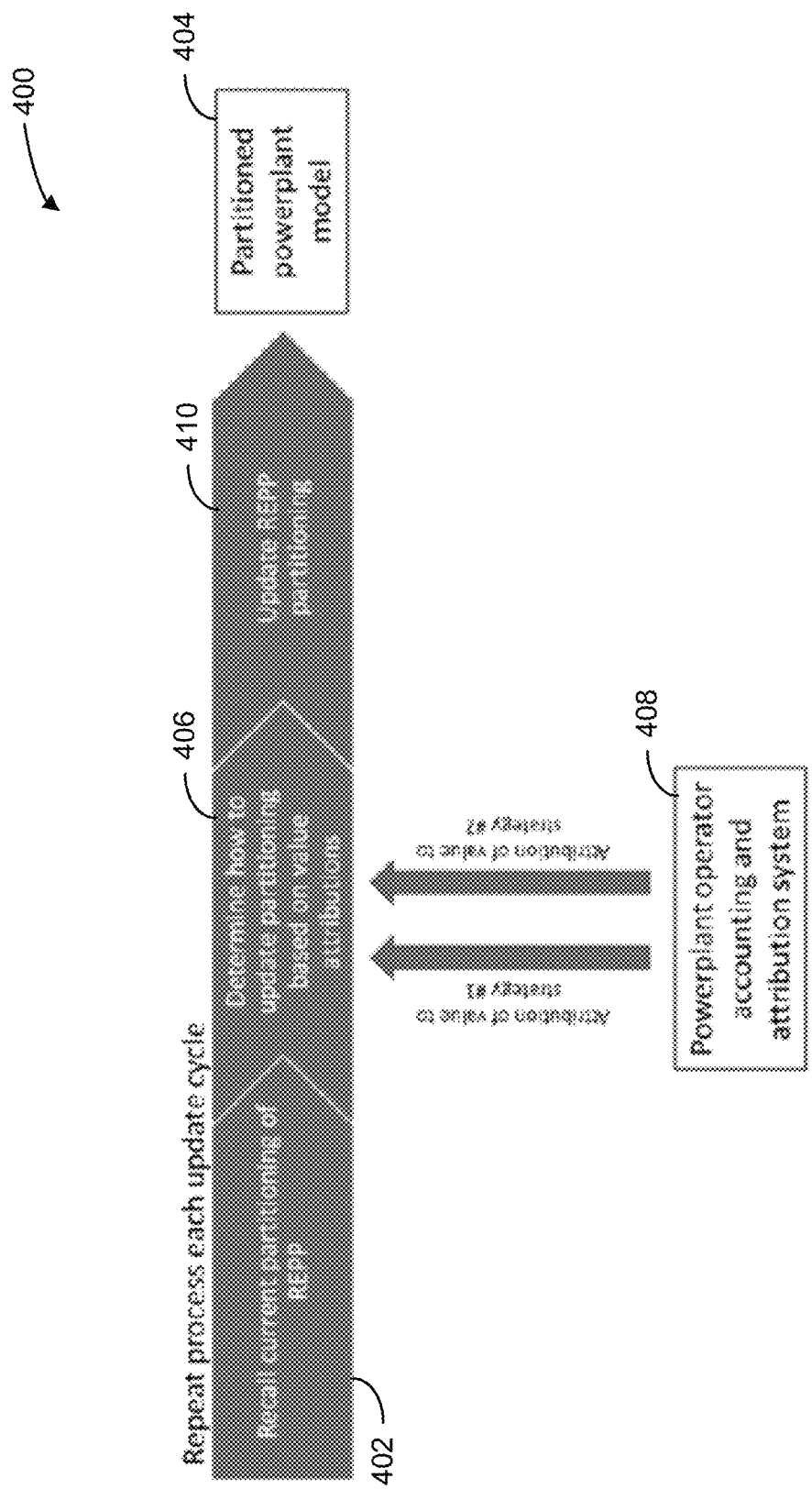
FIG. 4 illustrates an example flow diagram for optimizing control of a renewable energy powerplant, according to some embodiments.

FIG. 4 illustrates an example flow diagram 400 for optimizing control of a renewable energy powerplant, according to some embodiments. The operations depicted in the flow diagram 400 can be performed by a data processing system (e.g., a controller, the RES–ESS dispatcher unit 36, the ESS controller 22, the RES SCADA controller 12, the computing device 1500, the energy manager 204, etc.). In some embodiments, the data processing system is the controller of a renewable energy plant (REPP) that contains an ESS (e.g., the ESS 206) and an RES system (RES system 208). The data processing system may be configured to control energy charge and/or discharge of the ESS and the RES system. The data processing system can do so based on bidding strategies that the data processing system implements within the REPP. The flow diagram 400 illustrates the process of updating capacities of partitions of an REPP.

For example, at operation 402, the data processing system can recall the current partitioning of the REPP in a partitioned powerplant model 404. The data processing system can recall the current partitioning by retrieving the data associated with the different partitions of the REPP from memory. The current partitioning can be or include initial partitions of the REPP or can be the most recent versions of such partitions. At operation 406, a powerplant operator account and attribution system 408 of the data processing system can determine scores of the partitions. The powerplant operator account and attribution system 408 can be similar to or the same as the powerplant operator account and attribution system 320, shown and described with reference to FIG. 3. The data processing system can determine how to update the partitions of the REPP (e.g., which partitions to increase and/or decrease and, in some cases, magnitudes of such increases and/or decreases) based on the scores of the partitions. At operation 410, the data processing system can adjust the capacities of the partitions according to the determined increases and/or decreases.

Figure 5:
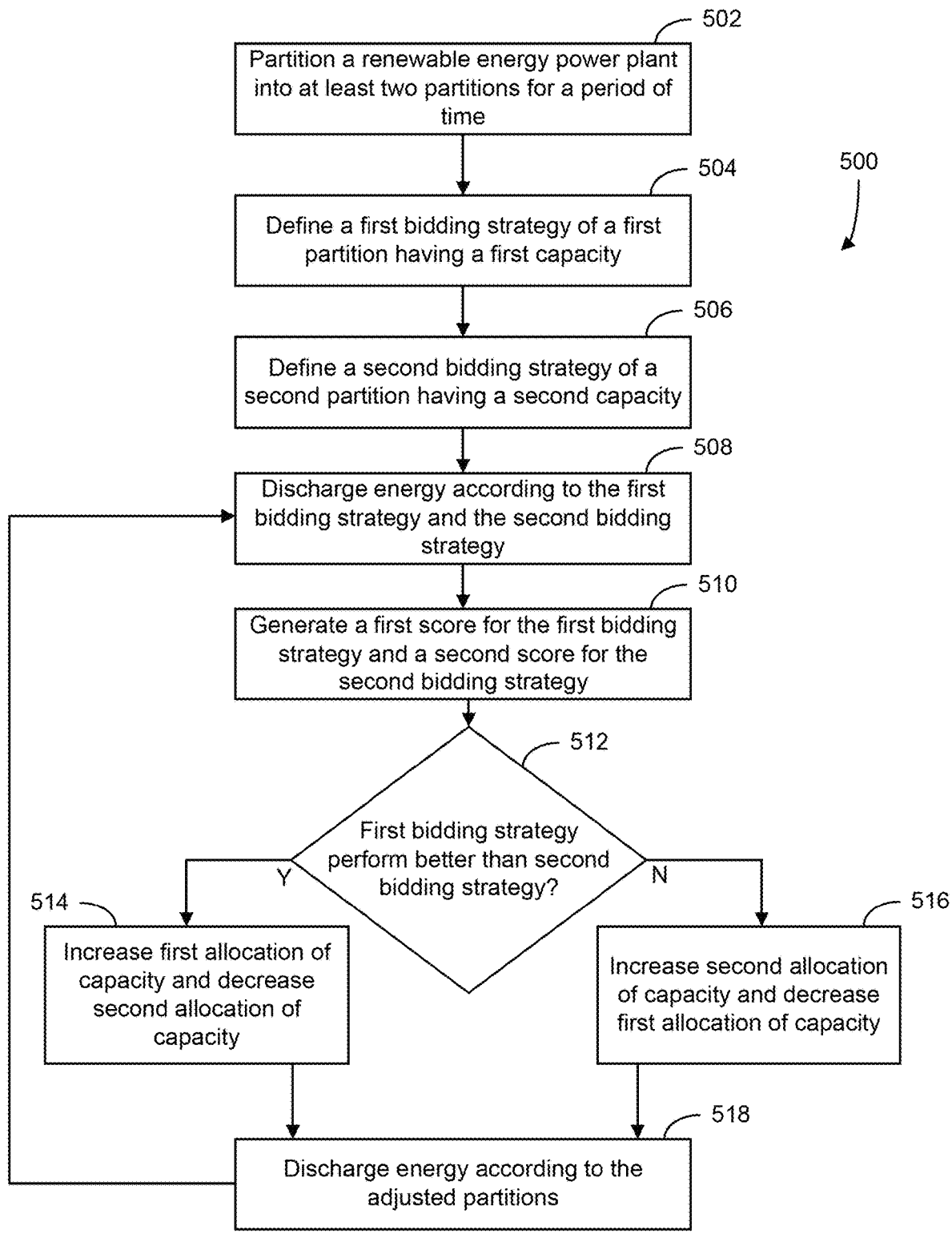
FIG. 5 illustrates a flowchart of an example method for optimizing control of a renewable energy powerplant, according to some embodiments.

FIG. 5 illustrates a flowchart of an example method 500 for optimizing control of a renewable energy powerplant, according to some embodiments. The method 500 can be performed by a data processing system (e.g., a controller, the RES–ESS dispatcher unit 36, the ESS controller 22, the RES SCADA controller 12, the computing device 1500, the energy manager 204, etc.). In some embodiments, the data processing system is the controller of a renewable energy plant (REPP) that contains an ESS (e.g., the ESS 206) and an RES system (e.g., the RES system 208). The data processing system may be configured to control energy charge and/or discharge of the ESS and the RES system. The data processing system can do so based on bidding strategies that the data processing system implemented within the REPP. To do so, the data processing system can partition the ESS and/or the RES system into two or more partitions (e.g., virtual partitions). The partitions can each correspond to an allocated capacity of the ESS and/or the RES system. The data processing system can generate a bidding strategy for each partition. The data processing system can control the ESS and the RES system for a time frame according to the bidding strategies for the partitions. The data processing system can evaluate the performance of the bidding strategies to determine scores for the partitions that correspond to the bidding strategies. The data processing system can compare the scores for the partitions with each other and increase or decrease the capacities of the partitions based on the scores (e.g., the data processing system can increase the capacities of partitions associated with higher scores and decrease the capacities of partitions associated with lower scores). The data processing system can control the ESS and/or the RES system based on the updated partitions according to the same bidding strategies and repeat the process over time. In doing so, the data processing system can cause the capacities of the partitions to converge such as until a single partition is allocated the maximum capacity of the REPP or one or more of the capacities reach a maximum or minimum bound. When a single partition reaches the maximum capacity of the REPP, the single partition can be adjusted to reach the maximum capacity based on the bidding strategy of the partition being associated with the highest scores over time. Accordingly, the data processing system can gradually optimize selection of a bidding strategy for optimal control of the REPP over time.

At operation 502, the data processing system partitions an REPP into at least two partitions for a period of time. The at least two partitions can each correspond a portion of a total capacity (e.g., energy storage capacity) of the REPP. The total capacity can include the maximum capacity or amount of energy stored by the ESS and, in some cases, an amount of energy (e.g., a forecast amount of energy) that is forecast to be generated by renewable energy sources of the REPP (e.g., the amount of energy that is forecasts to be generated over time). The data processing system can receive the forecast amount of energy from a service that is configured to determine an amount of energy that the RES system of the REPP will generate for set time periods, such as based on weather forecasts. The data processing system can aggregate the forecast amount of energy with the current capacity or amount of energy that is stored in the ESS to determine a maximum capacity of the REPP. The data processing system can divide the capacity by the number of partitions and allocate the capacity to each partition.

At operations 504 and 506, the data processing system defines a first bidding strategy of a first partition and a second bidding strategy of a second partition. The first partition can have a first capacity. The second partition can have a second capacity. The data processing system can define the first bidding strategy and the second bidding strategy by determining the first bidding strategy and the second bidding strategy. A user (e.g., a grid operator) can input first bidding strategy and the second bidding strategy or the data processing system can determine the first bidding strategy and the second bidding strategy using a computer model (e.g., a machine learning model or a rules-based model). The computer can be configured or trained to output components of a defined number (e.g., two) of bidding strategies based on bidding criteria. The data processing system can input bidding criteria (e.g., the marginal cost of producing and delivering power requirements to deliver power to the energy grid 210 at particular times of day (e.g., to comply with the terms of a power purchase agreement (PPA)), whether the REPP will be online or offline (e.g., for maintenance) in any particular time frame or sub-time frame, whether the REPP will need to be operating and delivering power for operational reasons in any time frame or sub-time frame, etc.) into the computer model and execute the computer model. The computer model can output bidding components for the defined number of bidding strategies. In doing so, the computer model can output a first bidding strategy for the first partition and a second bidding strategy for the second partition.

At operation 508, the data processing system discharges energy according to the first bidding strategy and the second bidding strategy. The data processing system can discharge energy to the energy grid. The data processing system can discharge energy from the ESS and/or the RES system. The data processing system can discharge energy from the ESS and/or the RES system to satisfy any PPAs that the powerplant operator associated with data processing system has with different customers and/or energy grid. The data processing system can discharge the energy based on the first bidding strategy and the second bidding strategy by discharging energy on an aggregated basis, while complying with the combined bids from the first partition according to the first bidding strategy and from the second partition according to the second bidding strategy. In some cases, in addition to discharging the energy, the data processing system can charge the ESS with energy from the grid and/or the RES system under the first bidding strategy and/or the second bidding strategy. The data processing system can assign values to energy discharged for the partitions according to the bidding strategies of the partitions. The values can be dynamic and change over time as the data processing system is controlling the charging and discharging of the ESS and the discharging of the RES system.

Discharging energy according to a bidding strategy can correspond to a bidding process between the data processing system and a system operator of the grid. For example, the data processing system can use the first bidding strategy and the second bidding strategy to generate bids for the first and second partitions. The data processing system can transmit the bids to a computer of the system operator. The computer or system operator can accept one or both of the bids of the first and second partitions. In doing so, the computer of the system operator can transmit dispatch control signals to the processing system indicating the bids are accepted and/or the amount the computer is willing to pay for the energy discharged to the grid and/or pay the data processing system for energy the grid provides to the REPP. The data processing system can receive and operate the RES and/or the ESS of the REPP according to the dispatch control signals. In this way, the data processing system can discharge energy according to the bidding strategies that were used to generate the bids that were accepted by the system operator.

At operation 510, the data processing system generates a first score for the first bidding strategy and a second score for the second bidding strategy. The data processing system may generate the first and second scores based on metrics that the data processing system determines for the first and second bidding strategies. For example, the data processing system can determine different metrics for each of the first and second bidding strategies based on data associated with the charge or discharge of the ESS and/or the RES system of the REPP according to the first and second bidding strategies and the first and second partitions. Examples of such metrics can include whether energy was delivered to the grid, how much revenue was generated, any change in ESS state of charge (SOC) resulting from being dispatched (or not), operating costs for the REPP, wear and tear on the REPP (such as full or partial cycling of an ESS), the historical volatility of metrics derived from previous bid-dispatch cycles, etc. The data processing system can determine the first and second scores as a function (e.g., an average, sum, weighted average, weighted sum, etc.) of the metrics for the respective bidding strategies.

At operation 512, the data processing system determines whether the first bidding strategy performed better than the second bidding strategy. The data processing system can compare the first score for the first bidding strategy and first partition with the second score for the second bidding strategy and second partition. The data processing system can determine the first bidding strategy performed better than the second bidding strategy responsive to determining the first score is higher than the second score. The data processing system can determine the second bidding strategy performed better than the first bidding strategy responsive to determining the second score is higher than the first score.

Responsive to determining the first bidding strategy performed better than the second bidding strategy (e.g., the first score is higher than the second score), at operation 514, the data processing system increases the first allocation of capacity of the first partition and decreases the second allocation of capacity of the second partition. The data processing system can increase the first allocation of capacity by a defined value and decrease the second allocation of capacity by the defined value. In some cases, the data processing system can determine the increase for the first allocation of capacity and the decrease in the second allocation of capacity as a function of or based on the first and second scores for the first and second partitions. For example, the data processing system can determine an increase based on a difference between the first score and an average score or median score of the partitions and/or the decrease based on a difference between the second score and the average score or median score of the partitions. The data processing system can determine the increase or decrease using any function. The data processing system can determine increases and decreases of the partitions such that the sum of the capacities of the partitions remains unchanged or otherwise does not exceed the maximum capacity of the REPP, a defined percentage of the maximum capacity of the REPP, or otherwise a defined capacity less than the maximum capacity of the REPP.

Responsive to determining the second bidding strategy performed better than the first bidding strategy (e.g., the second score is higher than the first score), at operation 516, the data processing system increases the second allocation of capacity of the second partition and decreases the first allocation of capacity of the first partition. The data processing system can increase the second allocation of capacity and decrease the first allocation of capacity similar to the manner of increasing the first allocation of capacity and decreasing the second allocation of capacity described with respect to the operation 514. In some embodiments, the data processing system can adjust the capacities of the partitions during the operations 512-516 using one of the methods 600 or 700, as described below.

At operation 518, the data processing system discharges energy according to the adjusted partitions. The data processing system can discharge energy to the energy grid according to the adjusted partitions by changing the allocation or attribution of the energy that is discharged to the energy grid. For example, the first and second bidding strategies may indicate percentages of the capacities of the partitions corresponding to the bidding strategies to discharge to the energy grid. By increasing the capacity of one partition and decreasing the capacity of another partition, the data processing system may increase or decrease the amount of energy that is discharged to the energy grid by the percentage assigned to the respective partitions. The data processing system can discharge energy from the ESS and/or the RES system. The data processing system can discharge energy from the ESS and/or the RES to satisfy any PPAs that the data processing system has with the different customers and/or energy grid.

The data processing system can discharge the energy based on the first bidding strategy and the second bidding strategy by discharging energy from the first partition according to the first bidding strategy and discharging from the second partition according to the second bidding strategy. In some cases, in addition to discharging the energy, the data processing system can charge the ESS with energy from the grid and/or the RES system under the first bidding strategy and/or the second bidding strategy. For example, the data processing system can generate bids under the first bidding strategy and the second bidding strategy for the first and second partitions, respectively. In determining the bids, the data processing system can take the capacities of the first and second partitions into account. The data processing system can receive dispatch signals based on the bids and evaluate the bidding strategies during the control of the ESS and the RES system based on the dispatch signals. The data processing system can repeat operations 508-518 for separate time frames to continually adjust the partitions to optimize the bidding strategies that the data processing system uses to deliver energy to the energy grid and/or receive energy from the energy grid.

In some cases, the data processing system can keep track of different characteristics of the partitions when discharging and/or otherwise controlling the partitions of the REPP. For example, for each partition and for each time frame of the period of time of the bidding strategies, the data processing system can store partition characteristics such as a forecast energy generated for different times or time frames of the period of time of the bidding strategies, expected times for online/offline statuses, marginal costs to produce power, marginal costs to deliver power, projected ESS state of charge etc. The data processing system can control charge and/or discharge of the ESS and/or the RES system of the REPP based on the partition characteristics of the partitions. In one example, the data processing system may not bid to provide energy to the energy grid for a bidding strategy if the current state of charge of the partition associated with the bidding strategy is zero or below a threshold. At the same time, however, the data processing system may bid to provide power to the energy grid if the state of charge of another partition is above the threshold. The data processing system can control the REPP using any partition characteristics.

Figure 6:
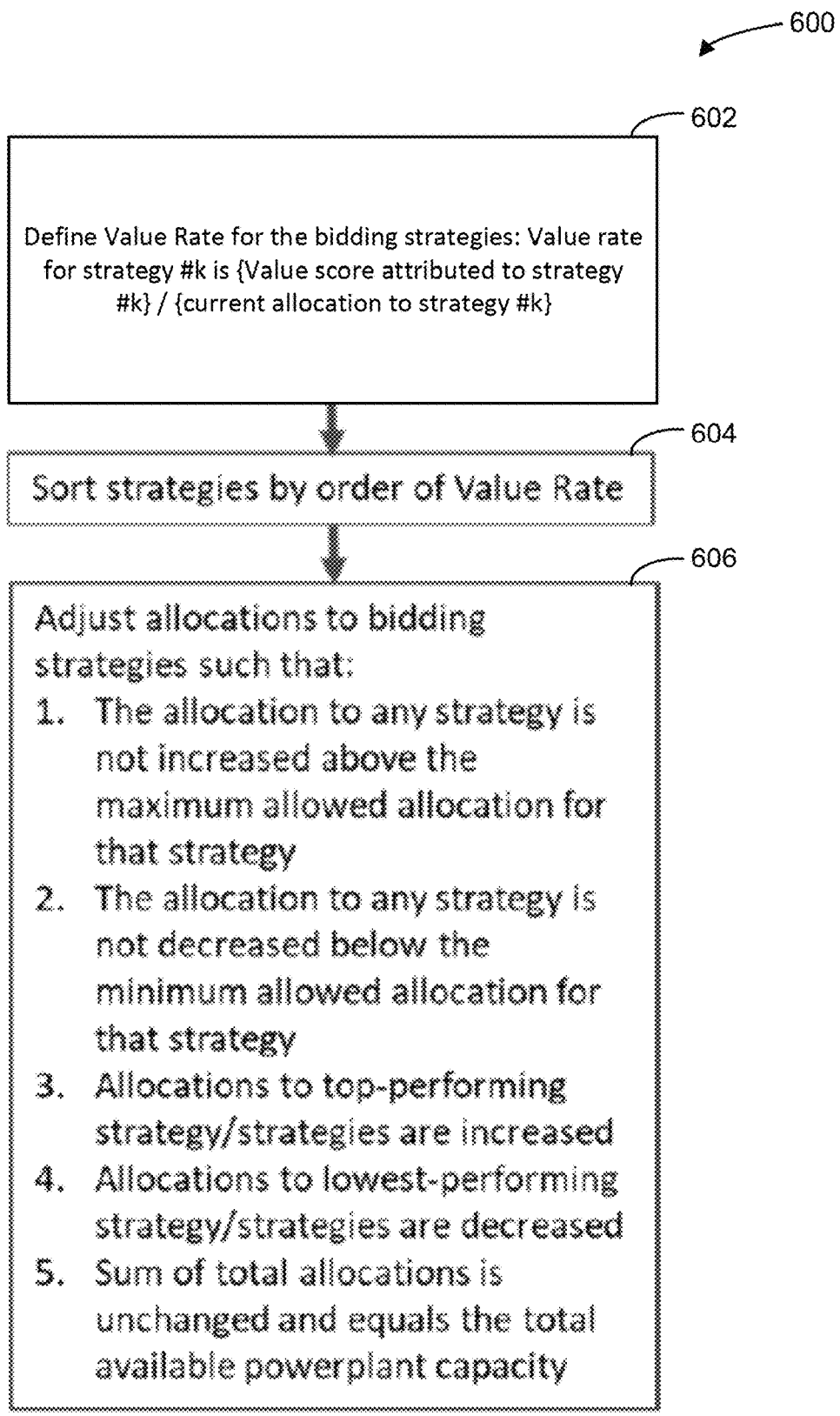
FIG. 6 illustrates a flowchart of an example method for adjusting allocations of bidding strategies, according to some embodiments.

FIG. 6 illustrates a flowchart of an example method 600 for adjusting allocations of bidding strategies, according to some embodiments. The method 600 can be performed by a data processing system (e.g., a controller, the RES-ESS dispatcher unit 36, the ESS controller 22, the RES SCADA controller 12, the computing device 1500, the energy manager 204, etc.). In some embodiments, the data processing system is the controller of a renewable energy plant (REPP) that contains an ESS (e.g., the ESS 206) and an RES system (RES system 208). The data processing system may be configured to control energy charge and/or discharge of the ESS and the RES system. The data processing system can perform the method 600 while performing the operations 512-516 of the method 500. For example, instead of performing the operations 512-516 in the method 500, the data processing system can perform the method 600. In another example, the data processing system can perform the operations 512-516 by performing the method 600. The data processing system can perform the method 600 to determine adjustments (e.g., increases and/or decreases) of capacity of the partitions of the REPP. The data processing system can perform the method 600 subsequent to partitioning the REPP between the bidding strategies, submitting bids for bidding strategies for the partitions to a system operator, receiving dispatch instructions from the system operator indicating which bids have been accepted, operating the REPP in response to the dispatch instructions, and generating a score for each partition or bidding strategy.

At operation 602, the data processing system defines (e.g., determines) a value rate for each bidding strategy. The data processing system can define the value rate for each bidding strategy by dividing the score (e.g., the value score) allocated to that strategy by the current allocation of the REPP's capacity to that bidding strategy. For example, the data processing system can determine the value rate for each bidding strategy according to the following formula:

$$\text{Value rate}_k = (\text{Score for strategy } \#k)/(\text{current allocation to strategy } \#k)$$

where k is the number or identifier for a particular bidding strategy.

At operation 604, the data processing system sorts the bidding strategies. The data processing system can sort the bidding strategies based on the value rates of the bidding strategies. For example, the data processing system can compare the value rates of the bidding strategies with each other. The data processing system can rank the bidding strategies in ascending or descending order based on the comparison (e.g., bidding strategies with higher value rates can be ranked higher than bidding strategies with lower value rates).

At operation 606, the data processing system adjusts the allocations of the partitions of the bidding strategies. The data processing system can adjust the allocations of the partitions by increasing and/or decreasing the allocations of the partitions. The data processing system can adjust the allocations of the partitions according to a set of rules. Examples of such rules can include, but are not limited to, (1) allocation to any strategy is not increased above the maximum allowed allocation for that strategy; (2) allocation to any strategy is not decreased below the minimum allowed allocation for that strategy; (3) within the limitations of (1), the allocation to the top-performing strategy/strategies increases; (4) within the limitations of (2), the allocation to the bottom-performing strategy/strategies decreases; and (5) the sum of total allocations is unchanged and equals the total available powerplant capacity.

The data processing system can determine increases and/or decreases in allocation for the bidding strategies based on the rankings of the bidding strategies. For example, the data processing system can determine to increase the allocations of capacity for a defined number of the highest ranked bidding strategies (e.g., the top two bidding strategies) and decrease the allocation of capacity for a defined number of the lowest ranked bidding strategies (e.g., the bottom two bidding strategies). The defined number of the highest ranked bidding strategies can be the same or can be different from the defined number of the lowest ranked bidding strategies. The increases and/or decreases can be by a defined amount. In some cases, the increases can be higher for higher ranked bidding strategies than for bidding strategies that are being increased but are lower ranked. Similarly, the decreases can be higher for lower ranked bidding strategies than for bidding strategies that are being decreased but are higher ranked. Such increases and/or decreases can be subject to the set of rules as outlined above.

Figure 7:
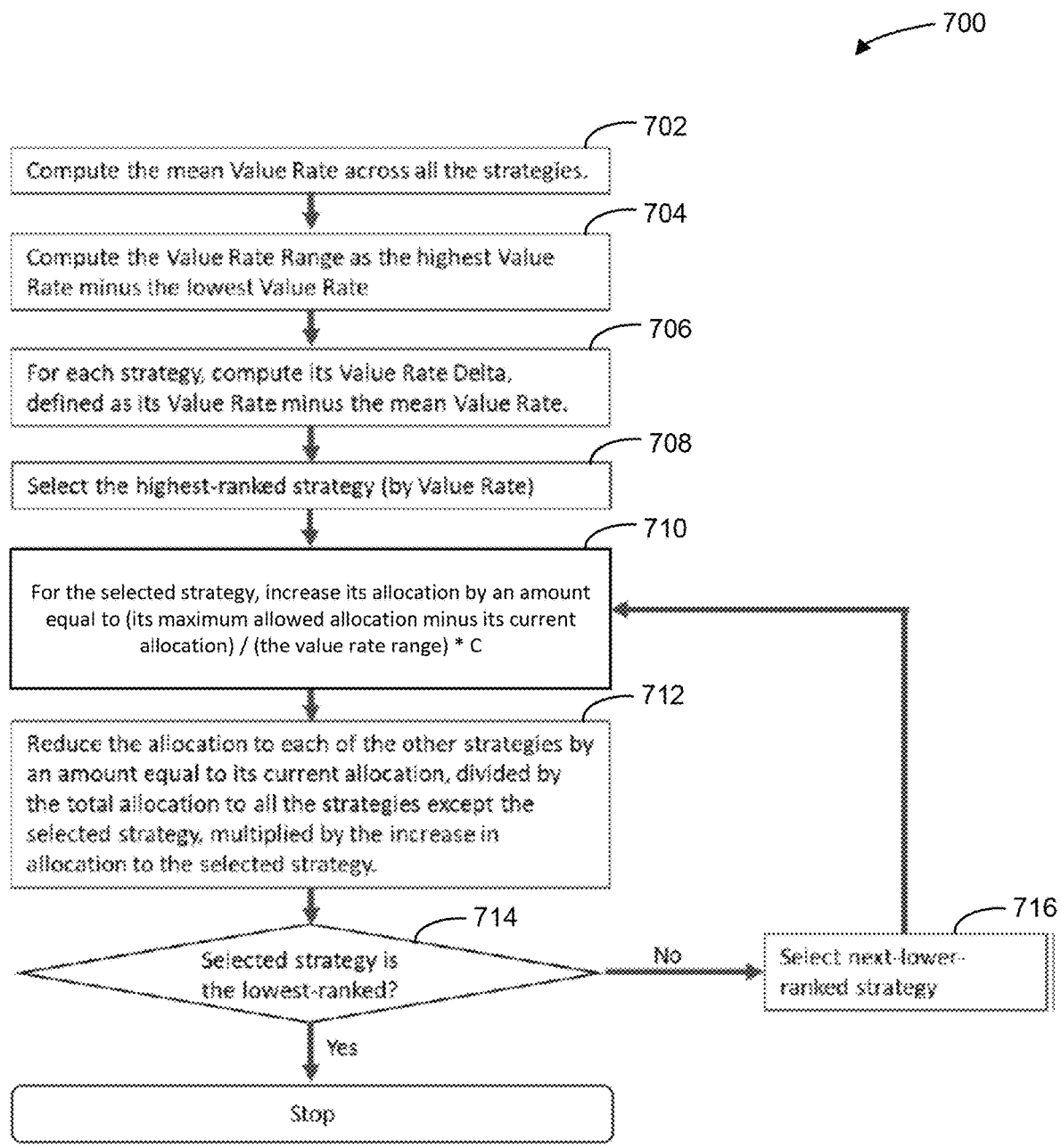
FIG. 7 illustrates a flowchart of an example method for adjusting allocations of bidding strategies, according to some embodiments.

FIG. 7 illustrates a flowchart of an example method 700 for adjusting allocations of bidding strategies, according to some embodiments. The method 700 can be performed by a data processing system (e.g., a controller, the RES–ESS dispatcher unit 36, the ESS controller 22, the RES SCADA controller 12, the computing device 1500, the energy manager 204, etc.). In some embodiments, the data processing system is the controller of a renewable energy plant (REPP) that contains an ESS (e.g., the ESS 206) and an RES system (RES system 208). The data processing system may be configured to control energy charge and/or discharge of the ESS and the RES system. The data processing system can perform the method 700 while performing the operations 512-516 of the method 500 (e.g., the data processing system can perform the method 700 instead of the method 600). For example, instead of performing the operations 512-516 in the method 500, the data processing system can perform the method 700. In another example, the data processing system can perform the operations 512-516 by performing the method 700. The data processing system can perform the method 700 to determine adjustments (e.g., increases and/or decreases) of capacity of the partitions of the REPP. The data processing system can perform the method 700 subsequent to partitioning the REPP between the bidding strategies, submitting bids for bidding strategies for the partitions to a system operator, receiving dispatch instructions from the system operator indicating which bids have been accepted, operating the REPP in response to the dispatch instructions, and generating a score for each partition or bidding strategy. It should be noted that the method 700 depicted in FIG. 7 is one method of adjusting allocations. The allocations can be adjusted in any manner.

In an operation 702, the data processing system computes the mean value rate of the bidding strategies of the partitions. The data processing system can compute the value rate of each of the bidding strategies as described above with respect to the operation 602. The data processing system can calculate a mean or an average of the computed value rates for the bidding strategies to generate the mean value rate. At operation 704, the data processing system computes a value rate range from the value rates. The data processing system can calculate the value rate range by subtracting the lowest value rate of the bidding strategies from the highest value rate of the bidding strategies. At operation 706, the data processing system can calculate a value rate delta for each of the bidding strategies. The data processing system can calculate the value rate delta for each bidding strategy by subtracting the mean value rate from the value rate of the bidding strategy.

At operation 708, the data processing system selects the highest-ranked strategy. For example, the data processing system can sort the bidding strategies. The data processing system can sort the bidding strategies based on the value rates of the bidding strategies. To do so, the data processing system can compare the value rates of the bidding strategies with each other. The data processing system can rank the bidding strategies in ascending or descending order based on the comparison (e.g., bidding strategies with higher value rates can be ranked higher than bidding strategies with lower value rates). The data processing system can identify or select the bidding strategy that is associated with the highest ranking (e.g., that has the highest value rate).

At operation 710, the data processing system increases the allocation of the selected bidding strategy. The data processing system can increase the allocation of the selected bidding strategy based on the value rate range and the value rate delta for the strategy. The data processing system can increase the allocation of the selected bidding strategy based further on the maximum allowed allocation (e.g., a defined maximum allowed allocation) for the bidding strategy. In one example, the data processing system can determine an increase in allocation for the selected bidding strategy according to the equation:

$$\text{Increase in allocation for bidding strategy}_k = (\text{available increase}_k/\text{value rate range})*(\text{the value rate delta for bidding strategy}_k)*C$$

where the data processing system determines the available increase according to the equation:

$$\text{available increase}_k = \text{maximum allowed allocation for bidding strategy}_k - \text{the current allocation for bidding strategy}_k,$$

k is the index value of the selected bidding strategy, and C can be a convergence rate. C can be less than 0.5 or any other value (e.g., any value less than 1 to establish convergence). Setting smaller values for C (e.g., values closer to zero) can increase the number of consecutive adjustments required to cause the allocation to the best bidding strategy to approach a maximum value for the bidding strategy.

At operation 712, the data processing system reduces the allocation to each of the other strategies. The data processing system can reduce the allocation of the other strategies according to following equation:

Decrease m=(current allocation of bidding strategy$_m$/ divided by the total allocation to all the strategies except the selected strategy$_k$)*the increase in allocation to bidding strategy$_k$ where m is the index value of the bidding strategy whose allocation is to be reduced and k is the index value of the bidding strategy selected for an increased allocation.

At operation 714, the data processing system determines if the selected bidding strategy is the lowest-ranked strategy. The data processing system can determine if the selected bidding strategy is the lowest-ranked by determining if there are any lower ranked bidding strategies.

Responsive to determining the selected bidding strategy is not the lowest-ranked bidding strategy, at operation 716, the data processing system can select the next lowest-ranked bidding strategy. The data processing system can repeat the operations 710-714 based on the newly selected bidding strategy. In some cases, when doing so, at the operation 712, the data processing system may only reduce the allocation of the other bidding strategies ranked lower than the newly selected bidding strategy. The data processing system can repeat the operations 710-714 until determining at the operation 714 that the selected bidding strategy is the lowest-ranked bidding strategy. Responsive to determining the selected bidding strategy is the lowest ranked bidding strategy at the operation 712, the data processing system can end the method 700.

Figure 8:
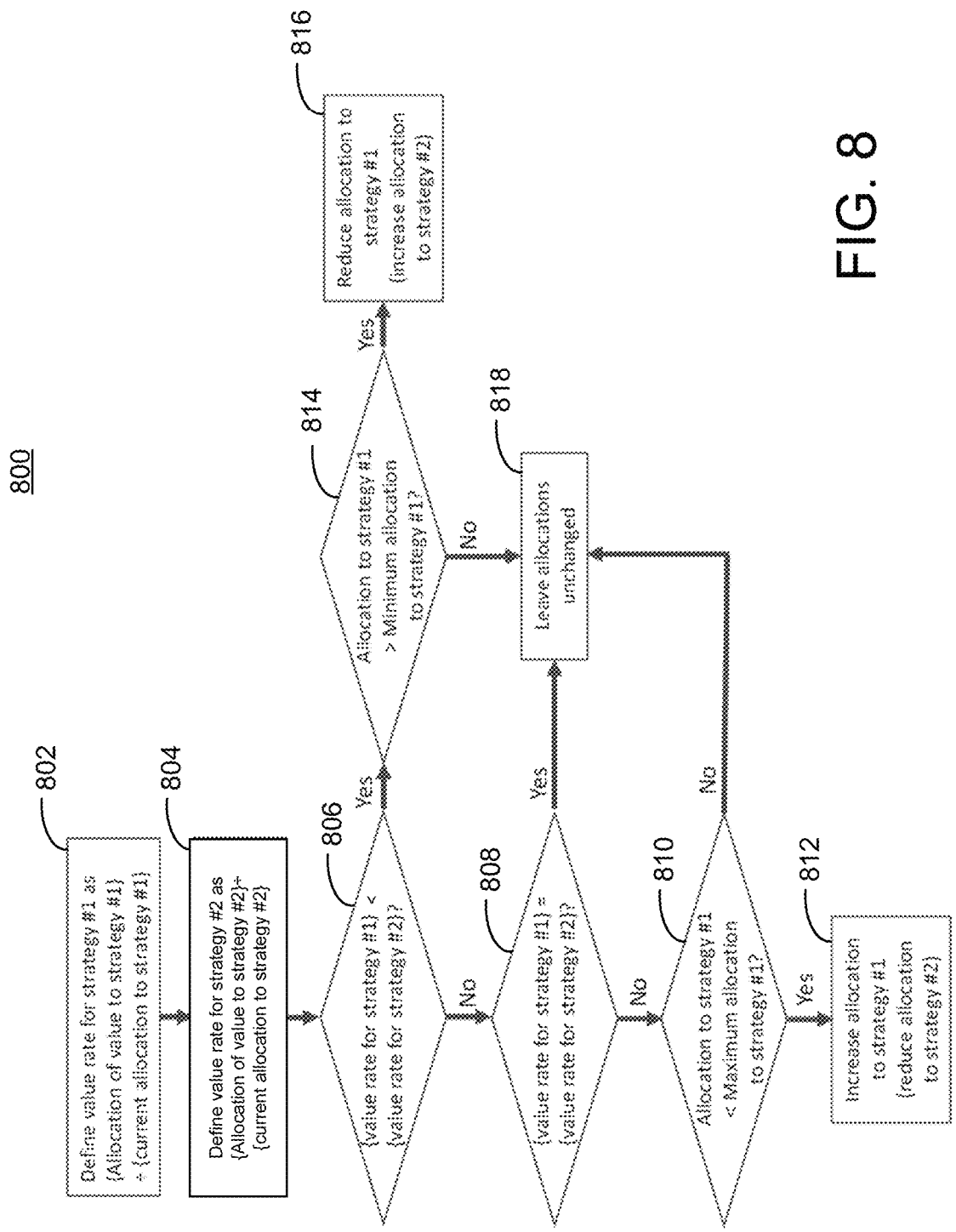
FIG. 8 illustrates a flowchart of an example method for adjusting allocations of bidding strategies, according to some embodiments.

FIG. 8 illustrates a flowchart of an example method 800 for adjusting allocations of bidding strategies, according to some embodiments. The method 800 can be performed by a data processing system (e.g., a controller, the RES-ESS dispatcher unit 36, the ESS controller 22, the RES SCADA controller 12, the computing device 1500, the energy manager 204, etc.). In some embodiments, the data processing system is the controller of a renewable energy plant (REPP) that contains an ESS (e.g., the ESS 206) and an RES system (RES system 208). The data processing system may be configured to control energy charge and/or discharge of the ESS and the RES system. The data processing system can perform the method 800 while performing the operations 512-516 of the method 500 (e.g., the data processing system can perform the method 800 instead of the method 600). For example, instead of performing the operations 512-516 in the method 500, the data processing system can perform the method 800. In another example, the data processing system can perform the operations 512-516 by performing the method 800. The data processing system can perform the method 800 to determine adjustments (e.g., increases and/or decreases) of capacity of the partitions of the REPP. The data processing system can perform the method 800 subsequent to partitioning the REPP between the bidding strategies, submitting bids for bidding strategies for the partitions to a system operator, receiving dispatch instructions from the system operator indicating which bids have been accepted, operating the REPP in response to the dispatch instructions, and generating a score for each partition or bidding strategy.

It should be noted that the method 800 depicted in FIG. 8 is one method of adjusting allocations. The allocations can be adjusted in any manner.

At operation 802, the data processing system determines a value rate for a first bidding strategy. The data processing system can determine the value rate for the first bidding strategy according to the following equation: value rate of bidding strategy 1=(allocation of value to bidding strategy 1)/(current allocation to bidding strategy 1). In an operation 804, the data processing system determines a value rate for a second bidding strategy. The data processing system can determine the value rate for the second bidding strategy according to the following equation: value rate of bidding strategy 2=(allocation of value to bidding strategy 2)/(current allocation to bidding strategy 2). At operation 806, the data processing system determines whether the value rate for the first bidding strategy is lower than the value rate of the second bidding strategy. Responsive to determining the value rate for the first bidding strategy is lower than the value rate of the second bidding strategy, at operation 808, the data processing system determines whether the value rates of the two bidding strategies is equal. Responsive to determining the value rates of the two bidding strategies are not equal, at operation 810, the data processing system determines whether the allocation of the first bidding strategy is less than a maximum for the first bidding strategy. Responsive to determining the allocation of the first bidding strategy is less than the maximum for the first bidding strategy, at operation 812, the data processing system increases the allocation of the first bidding strategy. The data processing system can reduce the allocation of the second bidding strategy according to the increase in cases in which the first bidding strategy and the second bidding strategy are the only bidding strategies and/or depending on the performance of other bidding strategies when there are more bidding strategies being evaluated.

Responsive to determining, at operation 806, that the value rate for the first bidding strategy is less than the value rate of the second bidding strategy, at operation 814, the data processing system determines whether the allocation to the first bidding strategy is greater than the minimum allocation for the first bidding strategy. Responsive to determining the allocation to the first bidding strategy is greater than the minimum allocation for the first bidding strategy, at operation 816, the data processing system reduces the allocation to the first bidding strategy. The data processing system can increase the allocation of the second bidding strategy according to the decrease in cases in which the first bidding strategy and the second bidding strategy are the only bidding strategies and/or depending on the performance of other bidding strategies when there are more bidding strategies being evaluated.

Responsive to determining that the value rate for the first bidding strategy is equal to the value rate of the second bidding strategy at operation 808, determining the allocation of the first bidding strategy is not less than the maximum allocation for the first bidding strategy at operation 810, or determining the allocation to the first bidding strategy is not greater than the minimum allocation of the first bidding strategy at operation 814, at operation 818, the data processing system leaves the allocations for the bidding strategies unchanged.

Figure 9:
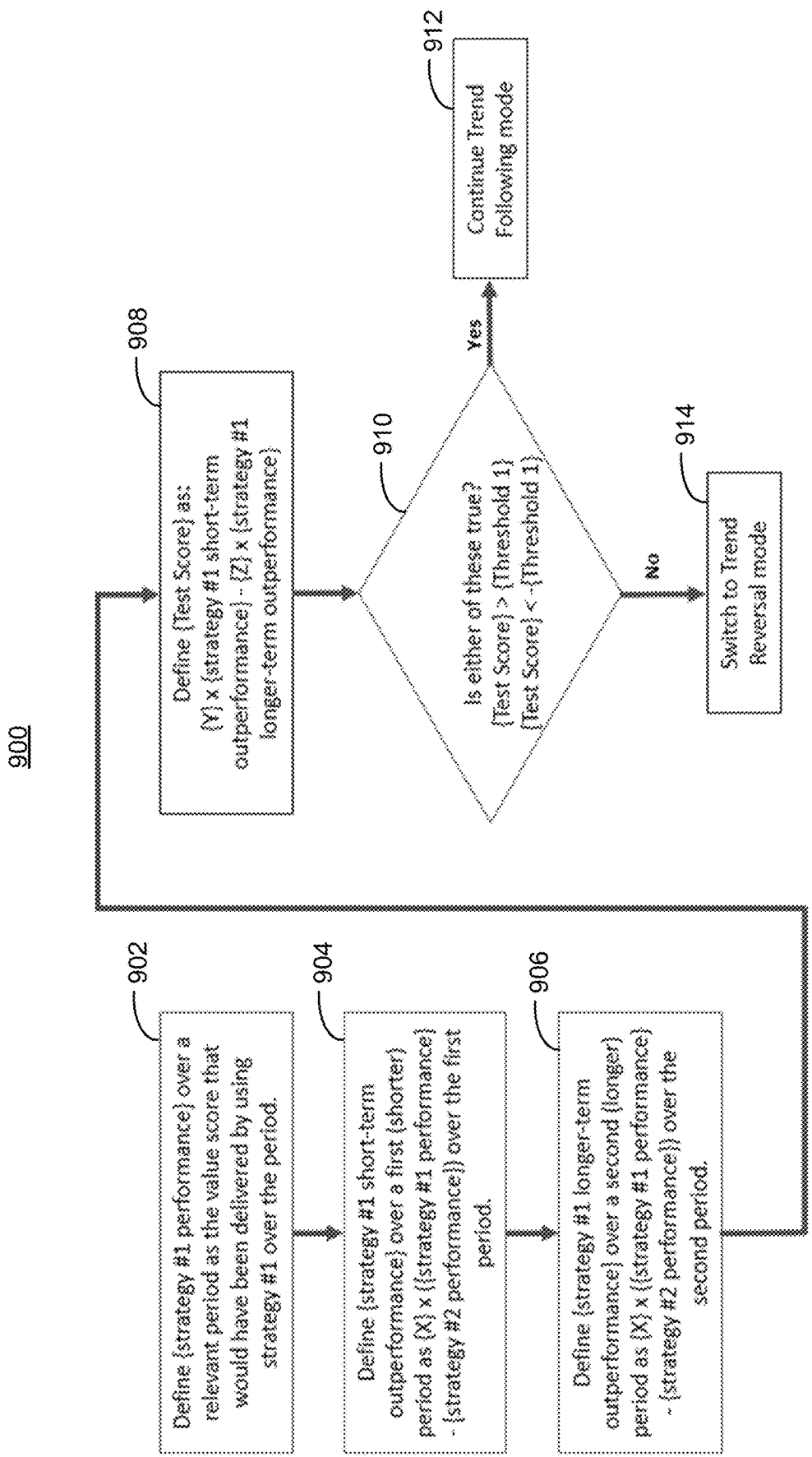
FIG. 9 illustrates a flowchart of an example method for adjusting allocations of bidding strategies, according to some embodiments.

FIG. 9 illustrates a flowchart of an example method 900 for adjusting allocations of bidding strategies, according to some embodiments. The method 900 can be performed by a data processing system (e.g., a controller, the RES-ESS dispatcher unit 36, the ESS controller 22, the RES SCADA controller 12, the computing device 1500, the energy manager 204, etc.). In some embodiments, the data processing system is the controller of a renewable energy plant (REPP) that contains an ESS (e.g., the ESS 206) and an RES system (RES system 208). The data processing system may be configured to control energy charge and/or discharge of the ESS and the RES system. The data processing system can perform the method 900 while performing the operations 512-516 of the method 500 (e.g., the data processing system can perform the method 900 instead of the method 600). For example, instead of performing the operations 512-516 in the method 500, the data processing system can perform the method 900. In another example, the data processing system can perform the operations 512-516 by performing the method 900. The data processing system can perform the method 900 to determine adjustments (e.g., increases and/or decreases) of capacity of the partitions of the REPP. The data processing system can perform the method 900 subsequent to partitioning the REPP between the bidding strategies, submitting bids for bidding strategies for the partitions to a system operator, receiving dispatch instructions from the system operator indicating which bids have been accepted, operating the REPP in response to the dispatch instructions, and generating a score for each partition or bidding strategy. It should be noted that the method 900 depicted in FIG. 9 is one method of adjusting allocations. The allocations can be adjusted in any manner.

At operation 902, the data processing system determines a performance score for a first bidding strategy for a time period as the value score (e.g., value rate of the first bidding strategy multiplied by capacity of the first bidding strategy) that would have been delivered by using the first bidding strategy over the time period. The data processing system can similarly determine a performance score for a second bidding strategy.

At operation 904, the data processing system determines an outperformance of the first bidding strategy for a first time period within the time period as (X)*((performance score of the first bidding strategy for the first time period)–(performance score for the second bidding strategy for the first time period)), where X is a variable which has a function to normalize the performance parameters. X can be defined, for example, as the number of MWh delivered over the first time period (e.g., the time period for which X is being used) multiplied by an expected price of energy per MWh. At operation 906, the data processing system determines an outperformance of the first bidding strategy for a second time period within the time period as (X)*((performance score of the first bidding strategy for the second time period)–(performance score for the second bidding strategy for the second time period)), where X can be defined, for example, as the number of MWh delivered over the second time period multiplied by an expected price of energy per MWh. The second time period can be longer than the first time period. In some cases, the second time period can include the first time period.

At operation 908, the data processing system determines a Test Score as (Y)*(the outperformance of the first bidding strategy for the first time period)–(Z)*(the outperformance of the first bidding strategy for the second time period). At operation 910, determines whether either of the following conditions is true: (Test Score)>(Threshold 1) or (Test Score)>–Threshold 1. Y and Z may be variables which may be considered as a pair and may be further related to Threshold 1. The values for Y, Z, and Threshold 1 may be determined through back-testing to determine to determine optimal values for each of the variables to deliver desired total value scores.

Responsive to determining one of conditions is true at operation 910, at operation 912, the data processing system can continue the trend following mode. The data processing system can continue the trend following mode, for example, by continuing to increase the allocation to the first bidding strategy and/or decreasing the allocation to the second bidding strategy, or vice versa, by increasing the allocation of the higher performing bidding strategy and decreasing the allocation of the lower performing bidding strategy. However, responsive to determining neither of the conditions is true at operation 910, at operation 914, the data processing system reverses the trend (e.g., switch to trend reversal mode). The data processing system can do so, for example, by performing the opposite allocation adjustments to trend following mode and increasing the allocation of the lower performing bidding strategy and decreasing the allocation of the higher performing bidding strategy.

Figure 10:
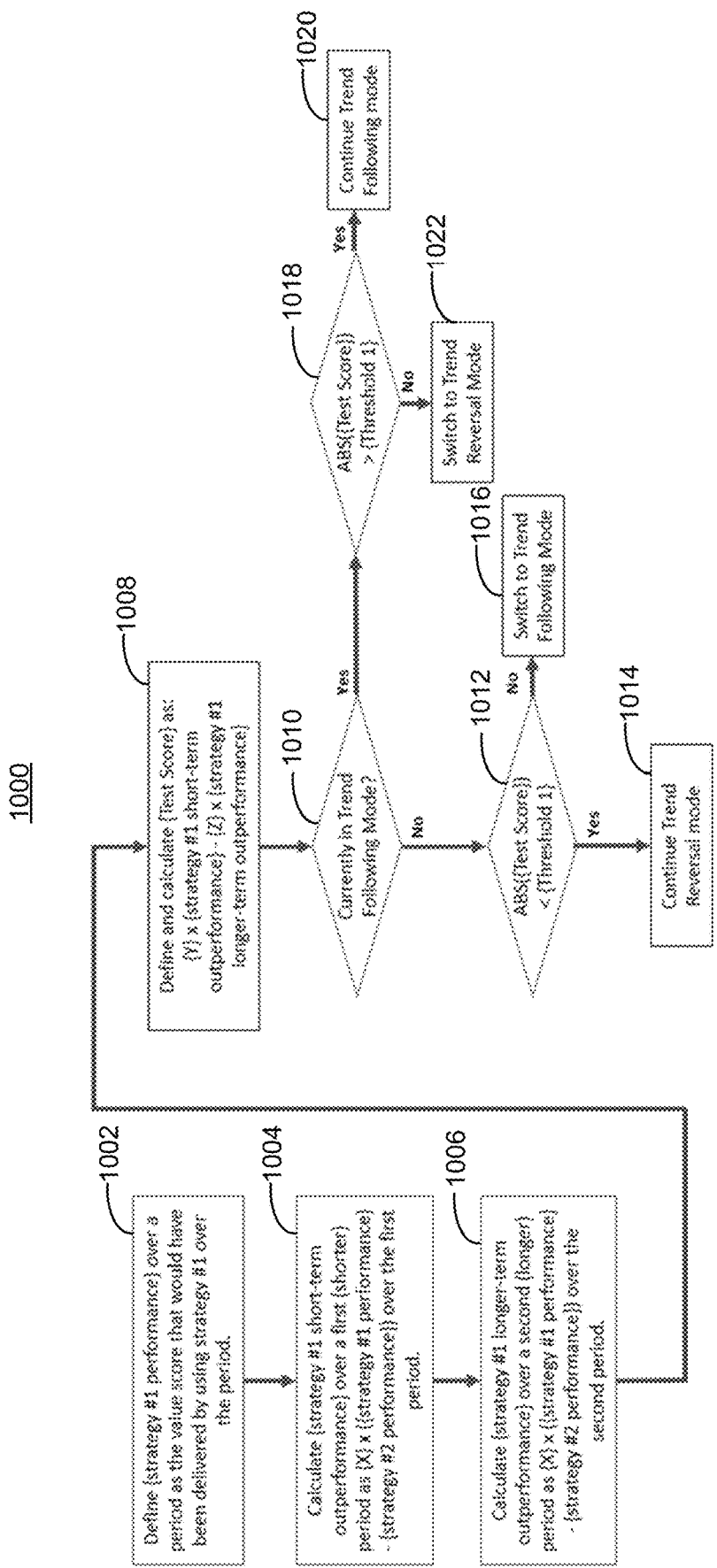
FIG. 10 illustrates a flowchart of an example method for adjusting allocations of bidding strategies, according to some embodiments.

FIG. 10 illustrates a flowchart of an example method for adjusting allocations of bidding strategies, according to some embodiments. The method 1000 can be performed by a data processing system (e.g., a controller, the RES–ESS dispatcher unit 36, the ESS controller 22, the RES SCADA controller 12, the computing device 1500, the energy manager 204, etc.). In some embodiments, the data processing system is the controller of a renewable energy plant (REPP) that contains an ESS (e.g., the ESS 206) and an RES system (RES system 208). The data processing system may be configured to control energy charge and/or discharge of the ESS and the RES system. The data processing system can perform the method 1000 while performing the operations 512-516 of the method 500 (e.g., the data processing system can perform the method 1000 instead of the method 600). For example, instead of performing the operations 512-516 in the method 500, the data processing system can perform the method 1000. In another example, the data processing system can perform the operations 512-516 by performing the method 1000. The data processing system can perform the method 1000 to determine adjustments (e.g., increases and/or decreases) of capacity of the partitions of the REPP. The data processing system can perform the method 1000 subsequent to partitioning the REPP between the bidding strategies, submitting bids for bidding strategies for the partitions to a system operator, receiving dispatch instructions from the system operator indicating which bids have been accepted, operating the REPP in response to the dispatch instructions, and generating a score for each partition or bidding strategy. It should be noted that the method 1000 depicted in FIG. 10 is one method of adjusting allocations. The allocations can be adjusted in any manner.

At operation 1002, the data processing system determines performance scores for a first bidding strategy and a second bidding strategy for a time period. At operation 1004, the data processing system determines an outperformance of the first bidding strategy for a first time period. At operation 1006, the data processing system determines an outperformance of the first bidding strategy for a second time period. At operation 1008, the data processing system determines a Test Score for the first bidding strategy. The data processing system can perform the operations 1002-1008 in the same or a similar manner to the manner described with respect to the operations 902-908 of the method 900.

At operation 1010, the data processing system determines whether the data processing system is currently in trend following mode. Trend following mode may be a mode in which the data processing system increases the allocation of the higher performing bidding strategy between the first bidding strategy and the second bidding strategy and decreases the allocation of the lower performing bidding strategy. Trend reversal mode may be the opposite of trend following mode (e.g., a mode in which the data processing system decreases the allocation of the higher performing bidding strategy between the first bidding strategy and the second bidding strategy and increases the allocation of the lower performing bidding strategy). The data processing system can determine whether the data processing system is currently in trend following mode by identifying a setting indicating which mode (e.g., trend following or trend reversal) the data processing system is in or by identifying the previous adjustments in allocation to the first and second bidding strategies and the scores based on which the data processing system performed the adjustments.

Responsive to determining the data processing system is not currently in trend following mode (e.g., determines the data processing system is in trend reversal mode), at operation 1012, the data processing system determines whether the absolute value of the Test Score for the first bidding strategy is less than a Threshold 1 (e.g., a defined threshold). Responsive to determining the absolute value of the Test Score for the first bidding strategy is less than Threshold 1, at operation 1014, the data processing system continues to use trend reversal mode. However, responsive to determining the absolute value of the Test Score is not lower than Threshold 1, at operation 1016, the data processing system switches modes to trend following mode.

However, responsive to determining the data processing system is currently in trend following mode at operation 1010, at operation 1018, the data processing system determines whether the absolute value of the Test Score for the first bidding strategy is greater than Threshold 1. Responsive to determining the absolute value of the Test Score for the first bidding strategy is greater than Threshold 1, at operation 1020, the data processing system continues to use trend following mode and increase or decrease the allocations to the first and second bidding strategies based on the scores of the first and second bidding strategies. However, responsive to determining the absolute value of the Test Score is not greater than Threshold 1, at operation 1022, the data processing system switches modes to trend reversal mode.

In a non-limiting example of performing the method 1000, suppose a first bidding strategy is underperforming and has a short-term average performance that is well below (e.g., a scalar factor times) the first bidding strategy's long-term average performance. This situation might be pretty unusual. When things return to normal the returns to the first bidding strategy are likely to be outsized for a while because too little resources will be allocated to it. Accordingly, when performance has been really bad recently, the data processing system may start to increase—not decrease—the allocation to the first bidding strategy. Up to this point, the data processing system may have been in trend following mode, so the switch to increasing the allocation to the first bidding strategy in spite of the low score of the first bidding strategy may indicate a switch to a trend reversal mode. In this regime, if there a couple of periods where returns improved a bit, the data processing system may partly reduce the allocation on the grounds that things are becoming less abnormal. If the returns get worse, the data processing system may add a little more to the allocation in anticipation of a possibly big result as the unusual condition passes. While in the trend reversal mode, the longer-term average performance may drift downward as the data processing system determines new low-return data points. Once the data processing system determines the first bidding strategy is better than (e.g., a scalar factor times) this average—even if it's just going sideways—the data processing system can return to trend following. As long as the first bidding strategy is not generating results that are not "unusually bad," the data processing system may use trend following mode (e.g., add to allocation when the recent result was good, reduce allocation when the recent result was weak). The data processing system may only trend-reverse when recent performance has been "unusually bad" and there is an opportunity to capitalize on the rebound.

Figure 11:
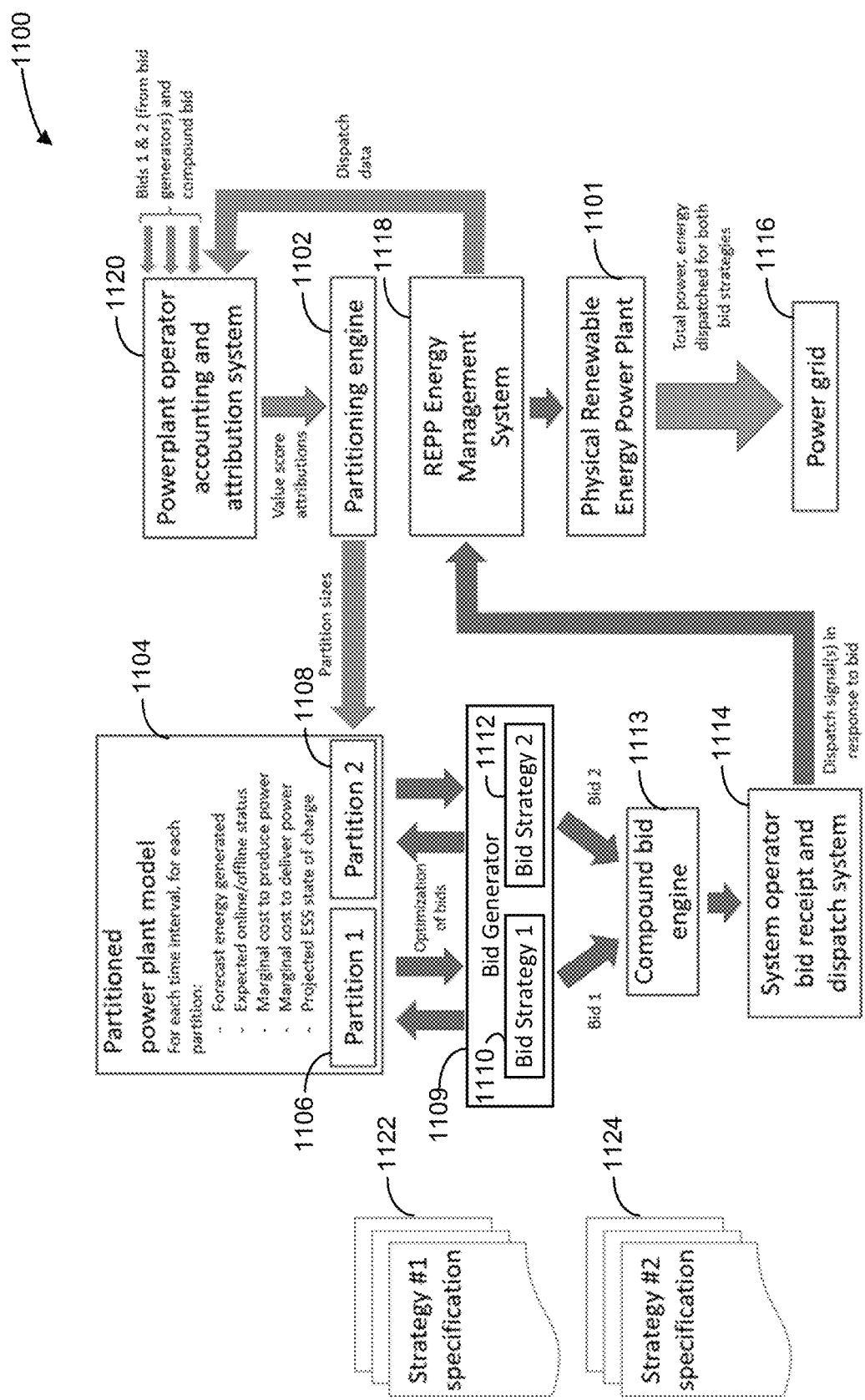
FIG. 11 illustrates an example flow diagram for optimizing control of a renewable energy powerplant, according to some embodiments.

FIG. 11 illustrates an example flow diagram 1100 for optimizing control of a renewable energy powerplant, according to some embodiments. The operations depicted in the flow diagram 1100 can be performed by a data processing system (e.g., a controller, the RES–ESS dispatcher unit 36, the ESS controller 22, the RES SCADA controller 12, the computing device 1500, the energy manager 204, etc.). In some embodiments, the data processing system is the controller of a renewable energy plant (REPP) 1101 that contains an ESS (e.g., the ESS 206) and an RES system (RES system 208). The data processing system may be configured to control energy charge and/or discharge of the ESS and the RES system. The data processing system can do so based on bidding strategies that the data processing system implemented within the REPP. The components of the flow diagram 1100 can be the same as or similar to the components of the flow diagram 300, shown and described with reference to FIG. 3A and FIG. 3B.

For example, a partitioning engine 1102 of the data processing system can partition the REPP 1101 into at least two partitions. The partitioning engine 1102 can be the same as or similar to the partitioner 218, shown and described with reference to FIG. 2. The partitioning engine 1102 can partition the REPP 1101 into separate partitions that each has its own capacity of the REPP 1101. In partitioning the REPP 1101, the partitioning engine 1102 can generate a partitioned powerplant model 1104. The partitioning engine 1102 can generate the partitioned powerplant model to have at least a first partition 1106 and a second partition 1108. Each partition can include values for different time intervals such as forecast energy generated, expected online/offline status, marginal cost to produce power, marginal cost to deliver power, projected ESS state of charge, etc. The data processing system (e.g., via the strategy engine 220) can input values for the partitions into a bid generator 1109. The bid generator 1109 can contain rules or modules for a first bidding strategy 1110 and a second bidding strategy 1112. The first bidding strategy 1110 may include one or more rules of a strategy specification 1122. The second bidding strategy 1112 may include one or more rules of a strategy specification 1124. The first bidding strategy 1110 may correspond with the first partition 1106. The second bidding strategy 1112 may correspond with the second partition 1108. The bid generator 1109 can execute the first bidding strategy 1110 and the second bidding strategy 1112 based on the input values to generate a bid for each bidding strategy 1110 and 112. The bid generator 1109 can transmit the bids to a compound bid engine 1113.

The compound bid engine 1113 may comprise programmable instructions that, upon execution, cause the data processing system to generate aggregate or composite bids from bids generated by the bid generator 1109. The compound bid engine 1113 can receive the bids generated by the bid generator 1109 based on the first bidding strategy 1110 and the second bidding strategy 1112. The compound bid engine 1113 can combine the two bids into a single compound bid. In one example of combining the two bids, the bid generator 1109 can generate a first bid offering up to 5 MW power for purchase for $50/MWh corresponding to the first bidding strategy 1110 and a second bid offering up to 5 MW power for purchase for $70/MWh corresponding to the second bidding strategy 1112. The compound bid engine 113 can combine the two offerings into a single bid of 5 MW power for purchase for $50/MWh and 5 MW power for purchase for $70/MWh.

The system operator bid receipt and dispatch system 1114 can determine whether to select or accept the compound bid received from the compound bid engine 1113. The system operator bid receipt and dispatch system 1114 can select the compound bid from the compound bid engine 1113. In some embodiments, the system operator bid receipt and dispatch system 1114 may only select a portion of the bid (e.g., only select the characteristics of one of the bids from which the compound bid was generated or only select portions of, but not all of, multiple bids that were used to generate the compound bid). Based on the selection, the system operator bid receipt and dispatch system 1114 can transmit dispatch signals to an REPP energy management system 1118 of the data processing system. The REPP energy management system 318 can include one or more processors or can include executable code configured to manage charging and/or discharging of the ESS and/or the RES system of the REPP 1101. The REPP energy management system 1118 can control the ESS and/or the RES system of the REPP 1101 to dispatch energy or power to the power grid 1116 according to the selected compound bid based on which the REPP energy management system 1118 received a dispatch signal.

The REPP energy management system 1118 can generate and transmit dispatch data to the powerplant operator accounting and attribution system 1120. The dispatch data can indicate amounts of power or energy the REPP 1101 discharged to the power grid 1116 and/or charged with from the power grid 1116. The REPP energy management system 1118 can also indicate the types of energy (e.g., renewable energy or non-renewable energy) that the REPP 1101 directs to the power grid 1116. The REPP energy management system 1118 can determine such data based on the source (e.g., the ESS of the REPP 1101 or an RES of the REPP 1101). The REPP energy management system 1118 can include values indicating the costs of the energy received from the power grid 1116 and/or discharged to the power grid 1116. The REPP energy management system 1118 can assign timestamps to the amounts to indicate when the energy was directed to the power grid 1116 and/or received from the power grid 1116. The REPP energy management system 1118 can generate and transmit such data for both of the bid strategies 1110 and 1112 to the powerplant operator account and attribution system 1120.

Based on the dispatch data received from the REPP energy management system 1118, the powerplant operator accounting and attribution system 1120 can determine a total value score for each of the bid strategies 1110 and 1112 (e.g., for each of the bidding strategies that generated a selected bid). The powerplant operator accounting and attribution system 1120 can do so according to any combination of the following metrics: whether energy was delivered to the grid, how much revenue was generated, any change in ESS state of charge (SOC) resulting from power or energy being dispatched (or not), operating costs for the REPP 1101, wear and tear on the REPP 1101 (such as full or partial cycling of an ESS), the historical volatility of metrics derived from previous bid-dispatch cycles, etc. The powerplant operator accounting and attribution system 1120 can use a function of the values for such metrics such as calculating an average, a sum, a weighted average, or a weighted sum of the values for the metrics.

The powerplant operator accounting and attribution system 1120 of the data processing system can be configured to determine scores for the individual bidding strategies. The scores for the individual bidding strategies can indicate how the bidding strategies performed during dispatch for a time frame of the compound bid generated based on the bidding strategies 1110 and 1112. The powerplant operator accounting and attribution system 1120 can determine such performance values based on the total value score and the capacities that the partitioning engine 1102 assigned to the partitions 1106 and 1108. For example, the powerplant operator accounting and attribution system 1120 can determine a percentage of the total value score for which each bidding strategy is responsible. In embodiments in which only one of the bids of the compound bid was selected, the powerplant operator accounting and attribution system 1120 can assign 100% of the total value score to the selected portion (e.g., the selected bid) and 0% to the other bid. The powerplant operator accounting and attribution system 1120 can determine such a percentage based on the amount of each metric for which each of the partitions 1106 and 1108 is responsible. The powerplant operator accounting and attribution system 1120 can identify the amount energy discharged and/or charged under the bid from the first bidding strategy and under the bid from the second bidding strategy and determine the metrics and percentages for the partitions 1106 and 1108 accordingly. The powerplant operator accounting and attribution system 1120 can multiply the percentages by the total value score to determine a score for each of the partitions 1106 and 1108. The powerplant operator accounting and attribution system 1120 can transmit the scores for each partition 1106 and 1108 to the partitioning engine 1102.

The partitioning engine 1102 can use the scores of the partitions 1106 and 1108 to determine adjustments for the capacities of the partitions 1106 and 1108. The partitioning engine 1102 can do so in the same or a similar manner to the partitioning engine 302, shown and described with reference to FIGS. 3A and 3B.

Figure 12:
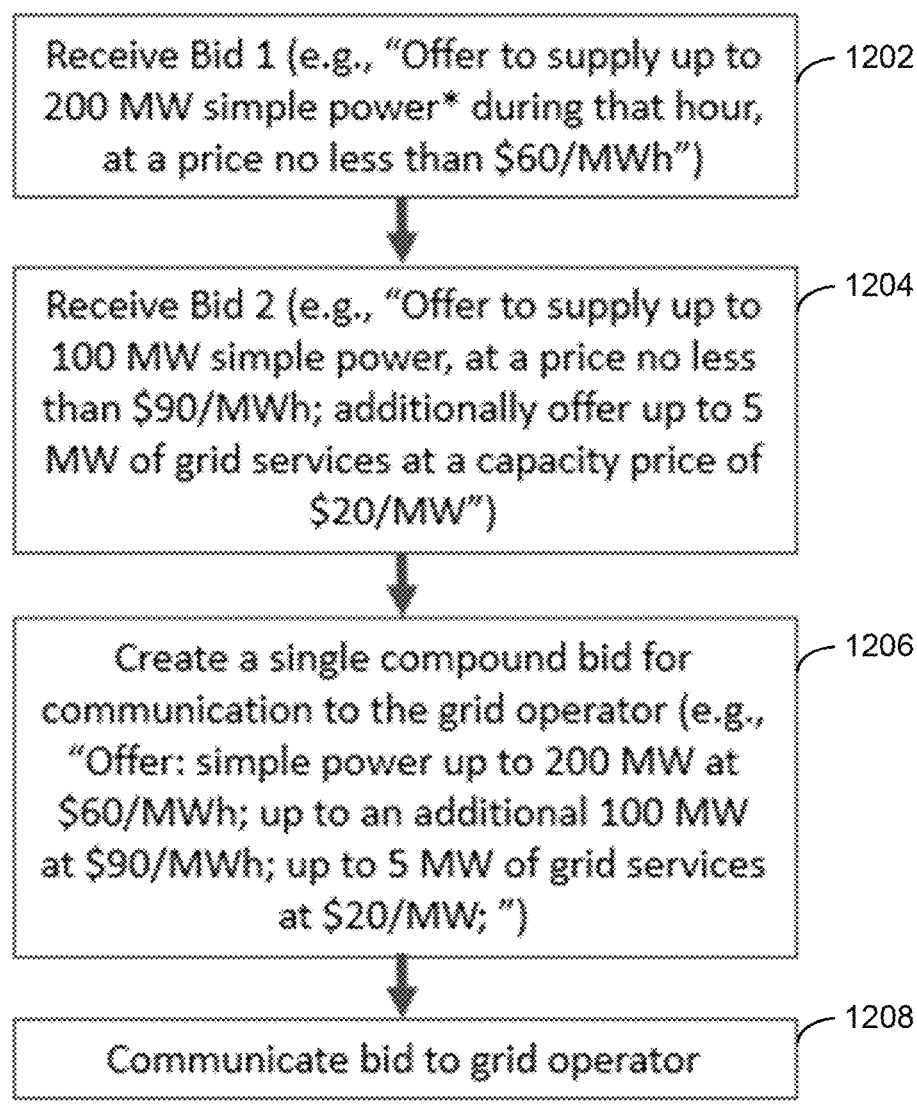
FIG. 12 illustrates a flowchart of an example method for generating a compound bid, according to some embodiments.

FIG. 12 illustrates a flowchart of an example method 1200 for generating compound bids, according to some embodiments. The method 1200 can be performed by a data processing system (e.g., a controller, the RES–ESS dispatcher unit 36, the ESS controller 22, the RES SCADA controller 12, the computing device 1500, the energy manager 204, etc.). In some embodiments, the data processing system is the controller of a renewable energy plant (REPP) that contains an ESS (e.g., the ESS 206) and an RES system (RES system 208). The data processing system may be configured to control energy charge and/or discharge of the ESS and the RES system. The data processing system can perform the method 1200 while performing the operations 508 of the method 500. The data processing system can perform the method 1200 to determine a compound bid to use to determine an optimal bidding strategy for the REPP. adjustments (e.g., increases and/or decreases) of capacity of the partitions of the REPP. The data processing system can perform the method 1200 subsequent to partitioning the REPP between the bidding strategies. It should be noted that the method 1200 depicted in FIG. 12 is one method of generating a compound bid. Compound bids can be generated in any manner.

At operation 1202, the data processing system receives or obtains a first bid. The first bid can be a bid generated from a first bidding strategy. The first bidding strategy may be a set of rules that can be used to generate bids. The first bidding strategy can be assigned to a first partition (e.g., a first partition of a first capacity) of an REPP. In one example, the first bid can be an offer to supply up to 200 MW simple power for an hour at a price of no less than $60/MWh. Simple power can denote power offered without grid services.

At operation 1204, the data processing system receives or obtains a second bid. The second bid can be a bid generated from a second bidding strategy. The second bidding strategy may be a set of rules that can be used to generate bids. The second bidding strategy can be assigned to a second partition (e.g., a second partition of a second capacity) of the REPP. In one example, the second bid can be an offer to supply up to 100 MW simple power for an hour at a price of no less than $90/MWh. The second bid can further include an offer of up to 5 MW of grid services at a capacity price of $20/MW.

At operation 1206, the data processing system creates a compound bid. The data processing system can create the compound bid from the first and second bids. The data processing system can create the compound bid by combining the first and second bids. Continuing the with two example bids above, the data processing system can create the compound bid to be an offer of simple power up to 200 MW at $60/MWh; up to an additional 100 MW at $90/MWh; and up to 5 MW of grid services at $20/MW. At operation 1208, the data processing system can transmit the compound bid to a grid operator of a power grid.

Figure 13:
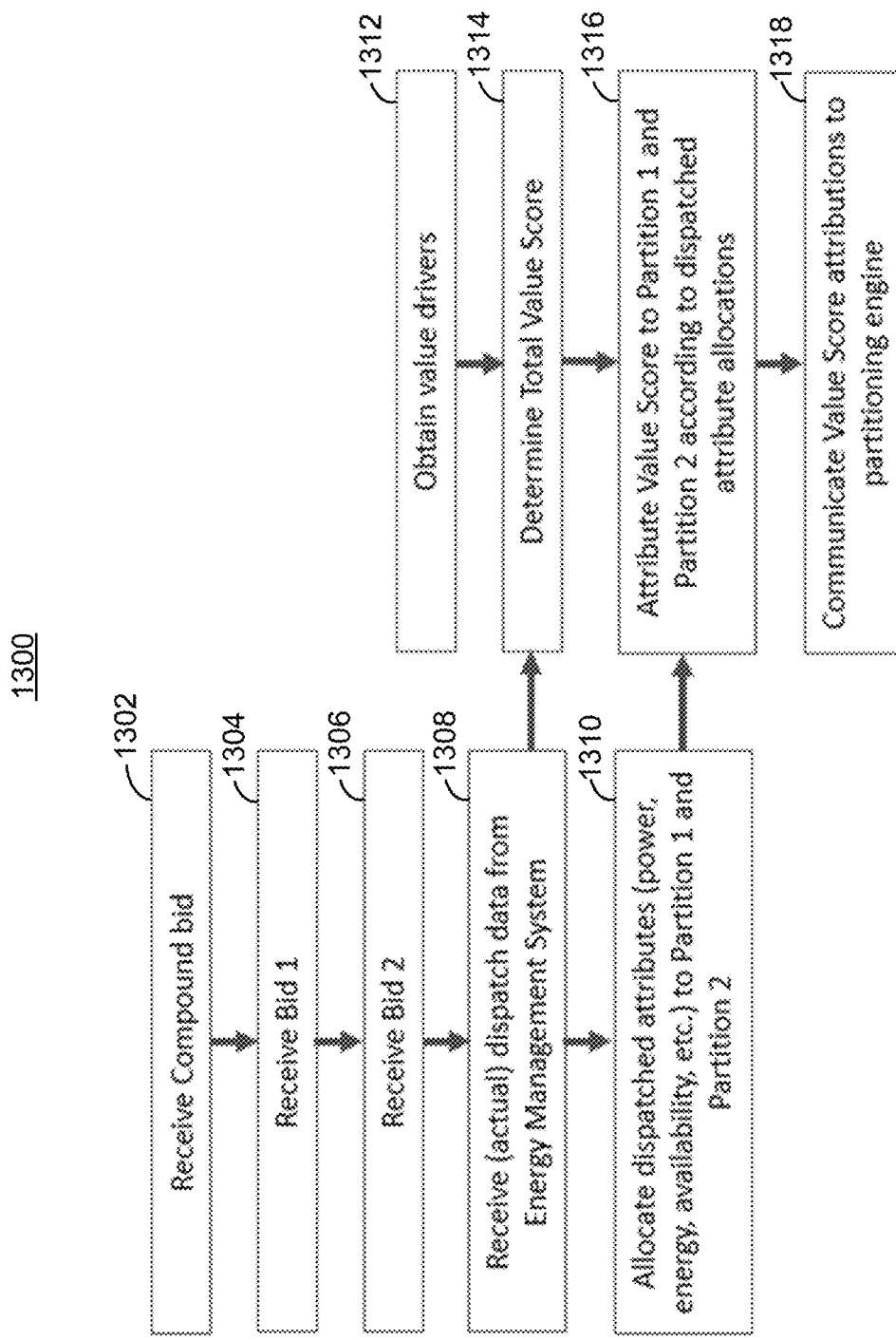
FIG. 13 illustrates a flowchart of an example method for attributing value scores to partitions of an REPP, according to some embodiments.

FIG. 13 illustrates a flowchart of an example method for adjusting allocations of bidding strategies, according to some embodiments. The method 1300 can be performed by a data processing system (e.g., a controller, the RES-ESS dispatcher unit 36, the ESS controller 22, the RES SCADA controller 12, the computing device 1500, the energy manager 204, etc.). In some embodiments, the data processing system is the controller of a renewable energy plant (REPP) that contains an ESS (e.g., the ESS 206) and an RES system (RES system 208). The data processing system may be configured to control energy charge and/or discharge of the ESS and the RES system. The data processing system can perform the method 1300 subsequent to performing the method 1200, for example. In some embodiments, the data processing system can perform the method 1300 subsequent to controlling the REPP to charge and/or discharge according to dispatch signals received from a grid operator. The data processing system can perform the method 1300 to determine a value score attributions for different bidding strategies and/or partitions associated with the bidding strategies.

At operations 1302, 1304, and 1306, the data processing system receives, obtains, and/or identifies a compound bid, a first bid, and a second bid. The compound bid can be a bid that the data processing system determined or generated based on the first bid and the second bid. The first bid can be a bid generated from a first bidding strategy. The first bidding strategy may be a set of rules that can be used to generate bids. The first bidding strategy can be assigned to a first partition (e.g., a first partition of a first capacity) of an REPP. The second bid can be a bid generated from a second bidding strategy. The second bidding strategy may be a set of rules that can be used to generate bids. The second bidding strategy can be assigned to a second partition (e.g., a second partition of a second capacity) of the REPP. The data processing system can create the compound bid from the first and second bids. The data processing system can create the compound bid by combining the first and second bids. The data processing system can transmit the compound bid to a grid operator of a power grid.

At operation 1308, the data processing system receives dispatch data. The dispatch data may be data regarding how the data processing system discharged and/or charged the REPP (e.g., an ESS of the REPP and/or one or more RES of the REPP) for a set time period and/or according to the portion of the compound bid that the grid operator selected, if not all of the compound bid. For example, subsequent to transmitting the compound bid to the system operator, the system operator and transmit dispatch signals to the data processing system that indicate how to charge and/or discharge the REPP according to the terms or characteristics of the compound bid. The data processing system may control the REPP according to the dispatch signals. In doing so, the data processing system can generate dispatch data indicating the amount, type, and/or the price of the energy that the REPP discharged to the power grid and/or received from the power grid. The data processing system can assign timestamps to the dispatch data that can be used when the price is scheduled to change over time.

At operation 1310, the data processing system allocates dispatched attributes to the first and second partitions. The dispatched attributes can be or include power, energy, capacity, availability, etc., of the partitions for the duration of the bids. The data processing system can allocate the dispatched attributes to the partitions based on the amounts of the attributes that the data processing system dispatched for the time period (e.g., the amounts that the system operator indicated in the dispatch signals to the data processing system). The data processing system can identify such dispatch attributes, for example, by identifying the portions of the bid that the system operator selected or acted upon in the dispatch signals. In cases in which the system operator selected the entire compound bid, the data processing system can identify the dispatch attributes to be the amounts of the respective bids.

At operation 1312, the data processing system obtains value drivers. The value drivers can be the metrics that the data processing system can use to determine value scores for partitions and/or bidding strategies. Examples of value drivers can include, but are not limited to, whether power was delivered to the grid, how much revenue was generated as a result, any change in ESS state of charge (SOC) resulting from being dispatched (or not), operating costs for the REPP, wear and tear on the REPP (such as full or partial cycling of an ESS), the historical volatility of metrics derived from previous bid-dispatch cycles, metrics related to compliance with one or more third-party PPAs, etc. The data processing system can receive such value drivers as user inputs and/or by retrieving the value drivers from memory.

At operation 1314, the data processing system determines a total value score. The data processing system can determine the total value score by applying the different value drivers to the characteristics of the charge and/or discharge of the REPP for the duration of the compound bid. The data processing system can calculate the total value score as a sum, average, median, weighted average, multiple, or any other function of the value drivers determined based on how the REPP discharged energy to the power grid and/or charged with energy from the power grid.

In some embodiments, the data processing system can perform the operations 1310-1314 in an iterative process. For instance, the data processing system can allocate the "demand" dispatched attributes (e.g., energy, power, availability, etc.) between the first and second partitions. The demand dispatched attributes can be the amounts of the attributes received in dispatch instructions. The data processing system can allocate the demand dispatched attributes according to the following rules: a) the allocation does not draw any more of an attribute from any respective bid than the respective bid offered, b) for each attribute, the sum of the allocations equals the demanded amount of the attribute, and c) the allocation is the lowest-cost/highest-value-score allocation that satisfies a and b. The costs and scores or weights for individual attributes may be defined in memory of the data processing system. The data processing system may use an optimization function or an objective function, such as gradient descent, to determine the lowest-cost/highest-value score allocation. The data processing system may iteratively perform this process, for example, by generating one or more hypothetical allocations at operation 1310, obtaining value drivers at operation 1312, and determining a total value score for the partitions at operation 1314. The data processing system may use the results to generate an improved new allocation, such as by increasing and/or decreasing allocated attributes between partitions according to the optimization function. The data processing system may generate improved allocations until determining a maximum total value score or a total value score that exceeds a threshold. Responsive to doing so, the data processing system may proceed to operation 1316.

At operation 1316, the data processing system attributes values scores to the first and second partitions. In some embodiments, the data processing system can attribute the value scores to the first and second partitions according to the dispatched attribute allocations determined at operation 1310. For example, the data processing system can identify the values of the allocated dispatched attributes to the first and second partitions. The data processing system can apply the identified values to the value drivers. In doing so, the data processing system can determine a value score for each of the first and second partition similar to how the data processing system determined the total value score for the unallocated dispatched attributes at operation 1314. In some embodiments, the data processing system can determine the value scores for the partitions and/or the bidding strategies associated with the partitions as portions of the total value score. The data processing system can determine a percentage for each of the first and second partitions based on the total amount of dispatched attributes that were allocated to the first and second partitions. The data processing system can determine the percentages using a function (e.g., an average, a sum, a weighted average, a weighted sum, a median, etc.) on the different allocated dispatched attributes and determining the percentage in which each of the partitions contributed to the total allocation. The data processing system can multiply the percentage by the total value score to determine attribute value scores for the first and second partitions. The data processing system can determine the attribute value scores for the first and second partitions in any way.

At operation 1318, the data processing system communicates (e.g., transmits) the value scores to a partitioning engine (e.g., the partitioner 218) to use to adjust the capacities and/or sizes of the first and second partitions.

FIG. 14 illustrates a sequence diagram of an example illustration 1400 for determining value scores for partitions and/or bidding strategies, according to some embodiments. A data processing system (e.g., a controller, the RES–ESS dispatcher unit 36, the ESS controller 22, the RES SCADA controller 12, the computing device 1500, the energy manager 204, etc.) can perform the operations of the illustration 1400 to determine value scores for partitions of an REPP and/or bidding strategies.

For example, the data processing system can generate a compound bid 1402 from a first bid 1404 and a second bid 1406. The first bid 1404 can be a bid generated from a first bidding strategy. The first bidding strategy may be a set of rules that can be used to generate bids. The first bidding strategy can be assigned to a first partition (e.g., a first partition of a first capacity) of an REPP. In one example, the first bid can be an offer to supply up to 200 MW simple power for an hour at a price of no less than $60/MWh. The second bid 1406 can be a bid generated from a second bidding strategy. The second bidding strategy may be a set of rules that can be used to generate bids. The second bidding strategy can be assigned to a second partition (e.g., a second partition of a second capacity) of the REPP. In one example, the second bid can be an offer to supply up to 100 MW simple power for an hour at a price of no less than $90/MWh. The second bid can further include an offer of up to 5 MW of grid services at a capacity price of $20/MW. The data processing system can generate the compound bid 1402 to be an offer of simple power up to 200 MW at $60/MWh; up to an additional 100 MW at $90/MWh; and up to 5 MW of grid services at $20/MW.

The data processing system can generate dispatch data 1408. The dispatch data 1408 may be data indicating how energy was discharged to the energy grid and/or charged from the energy grid based on the bids 1404 and 1406 of the compound bid 1402 (e.g., based on the dispatch signals generated by the system operator of the power grid and transmitted to the data processing system). In one example, the dispatch data 1408 may be or include 210 MW of simple power accepted and dispatched at $95/MWh clearing price; 5 MW of grid services accepted; 3 MW of grid services dispatched for 15 minutes.

The data processing system can attribute revenues 1410 to value scores for the partitions of the REPP. The attributed revenues 1410 can be attributions of revenue the REPP generated while complying with the dispatch signals from the system operator of the power grid for each of the partitions of the REPP. For example, the data processing system can attribute revenues 1410 according to the dispatch data 1408 according to the following:

200 MW of simple power attribute to the first bid 1404 because of the lower price of the first bid 1404->200 MWh*$95/MWh=$19,00 to the first partition;

Remaining 10 MW of simple power attributed to the second bid 1406->=$950 to the second partition;

Grid service offer from the second bid 1406 was accepted->5 MW*$20=$100 to the second partition;

Grid services dispatched 3 MW for 15 minutes->0.75 MWh*$95/MWh-$71.25 to the second partition; and Total revenue attributions: $19,000 to the first partition, and $1,121.25 to the second partition.

The revenue attributes can be used as a metric to determine scores for the first partition and the second partition with any other metrics to determine whether to increase and/or decrease the partitions.

In one aspect, the disclosure describes a method. The method can include partitioning a renewable energy powerplant (REPP) into at least two partitions for a period of time to deliver energy during the period of time, wherein the at least two partitions each include an allocation of a total energy capacity of the REPP; defining a first bidding strategy of a first partition of the at least two partitions for the period of time, wherein the first partition includes a first allocation of capacity; defining a second bidding strategy of a second partition of the at least two partitions for the period of time, wherein the second partition includes a second allocation of capacity; generating a first score for the first bidding strategy of the first partition and a second score for the second bidding strategy of the second partition; adjusting the at least two partitions based on the first score and the second score; and discharging energy from the REPP according to the adjusted at least two partitions.

In some embodiments, the method can include discharging energy from the REPP according to the first bidding strategy of the first partition and the second bidding strategy of the second partition; and evaluating the discharging of energy from the REPP according to the first bidding strategy and the second bidding strategy, wherein generating the first score and the second score is based at least on the evaluating the discharge of energy from the REPP according to the first bidding strategy and the second bidding strategy. In some embodiments, evaluating the discharging of energy comprises determining the first score based at least on an amount of energy that was discharged to an energy grid from the first partition, a change in state of charge of an energy storage system (ESS) of the first partition, and a value of energy under the first bidding strategy.

In some embodiments, defining the first bidding strategy comprises assigning a first dynamic value to first energy under the first partition for the period of time and defining the second bidding strategy comprises assigning a second dynamic value to second energy under the second partition for the period of time. In some embodiments, adjusting the at least two partitions comprises comparing the first score of the first bidding strategy with the second score of the second bidding strategy; and responsive to the first score exceeding the second score, increasing a first energy capacity of the first partition and decreasing a second energy capacity of the second partition.

In some embodiments, increasing the first energy capacity and decreasing the second energy capacity comprises increasing the first energy capacity to the total energy capacity of the REPP and decreasing the second energy capacity to zero. In some embodiments, the method can include storing, in memory, a maximum limit for the first partition and a minimum limit for the second partition. Increasing the first energy capacity and decreasing the second energy capacity can include determining a first increase in the first energy capacity would cause the first energy capacity to exceed the maximum limit for the first partition or a first decrease in the second energy capacity would cause the second energy capacity to be below the minimum limit for the second partition; and adjusting the first increase in the first energy capacity to the maximum limit for the first partition or the first decrease in the second energy capacity to the minimum limit for the second partition. In some embodiments, the method can include subsequent to adjusting the at least two partitions, determining the period of time has ended; and responsive to determining the period of time has ended, resetting the first partition to a defined first energy capacity and the second partition to a defined second energy capacity. In some embodiments, partitioning the REPP into the at least two partitions comprises causing a sum of energy capacities of the at least two partitions to equal the total energy capacity of the REPP.

In some embodiments, the method can include adjusting the at least two partitions without regard to any scores for any bidding strategies of the at least two partitions prior to an end of the period of time. In some embodiments, the method can include determining a mean performance value for the at least two partitions based on performance of bidding strategies of the at least two partitions; determining a performance value delta for each of the at least two partitions based on a difference between a performance value of the partition and the mean performance value; and determining the first partition corresponds to a highest performance value delta, wherein adjusting the at least two partitions comprises increasing the first allocation of capacity for the first partition based on the first partition corresponding to the highest performance value delta.

In some embodiments, the method can include determining a performance value range for the at least two partitions; and determining an increase for the first allocation based on an available increase for the first allocation, the performance value range, and the performance value delta of the first partition, wherein increasing the first allocation of capacity for the first partition comprises increasing the first allocation by the determined increase for the first allocation. In some embodiments, the method can include determining the available increase for the first allocation as a function of the first allocation of capacity and a maximum allocation of capacity for the first partition.

In another aspect, the present disclosure describes a system. The system can include a renewable energy powerplant (REPP) coupled to an energy grid; and one or more processors. The one or more processors can be configured to partition the REPP into at least two partitions for a period of time to deliver energy during the period of time, wherein the at least two partitions each include an allocation of a total energy capacity of the REPP; define a first bidding strategy of a first partition of the at least two partitions for the period of time, wherein the first partition includes a first allocation of capacity; define a second bidding strategy of a second partition of the at least two partitions for the period of time, wherein the second partition includes a second allocation of capacity; generate a first score for the first bidding strategy of the first partition and a second score for the second bidding strategy of the second partition; adjust the at least two partitions based on the first score and the second score; and discharge energy from the REPP according to the adjusted at least two partitions.

In some embodiments, the one or more processors are further configured to discharge energy from the REPP according to the first bidding strategy of the first partition and the second bidding strategy of the second partition; and evaluate the discharge of energy from the REPP according to the first bidding strategy and the second bidding strategy, wherein the one or more processors are configured to generate the first score and the second score based at least on the evaluating the discharge of energy from the REPP according to the first bidding strategy and the second bidding strategy. In some embodiments, the one or more processors are configured to evaluate the discharge of energy by determining the first score based at least on an amount of energy that was discharged to the energy grid, a change in state of charge of an energy storage system (ESS) of the REPP, and a value of energy under the first bidding strategy.

In some embodiments, the one or more processors are configured to define the first bidding strategy by assigning a first dynamic value to first energy of the first partition for the period of time and defining the second bidding strategy comprises assigning a second dynamic value to second energy of the second partition for the period of time. In some embodiments, the one or more processors are configured to adjust the at least two partitions by comparing the first score of the first bidding strategy with the second score of the second bidding strategy; and responsive to the first score exceeding the second score, increasing a first energy capacity of the first partition and decreasing a second energy capacity of the second partition.

In another aspect, the present disclosure describes non-transitory computer-readable media comprising instructions that, when executed by one or more processors, cause the one or more processors to partition a renewable energy powerplant (REPP) into at least two partitions for a period of time to deliver energy during the period of time, wherein the at least two partitions each include an allocation of a total energy capacity of the REPP; define a first bidding strategy of a first partition of the at least two partitions for the period of time, wherein the first partition includes a first allocation of capacity; define a second bidding strategy of a second partition of the at least two partitions for the period of time, wherein the second partition includes a second allocation of capacity; generate a first score for the first bidding strategy of the first partition and a second score for the second bidding strategy of the second partition; adjust the at least two partitions based on the first score and the second score; and discharge energy from the REPP according to the adjusted at least two partitions. In some embodiments, execution of the instructions further causes the one or more processors to discharge energy from the REPP according to the first bidding strategy of the first partition and the second bidding strategy of the second partition; and evaluate the discharge of energy from the REPP according to the first bidding strategy and the second bidding strategy, wherein execution of the instructions causes the one or more processors to generate the first score and the second score based at least on the evaluation of the discharge of energy from the REPP according to the first bidding strategy and the second bidding strategy.

Computing Environment

Having discussed specific embodiments of the present solution, it may be helpful to describe aspects of the operating environment as well as associated system components (e.g., hardware elements) in connection with the methods and systems described herein.

Figure 15A:
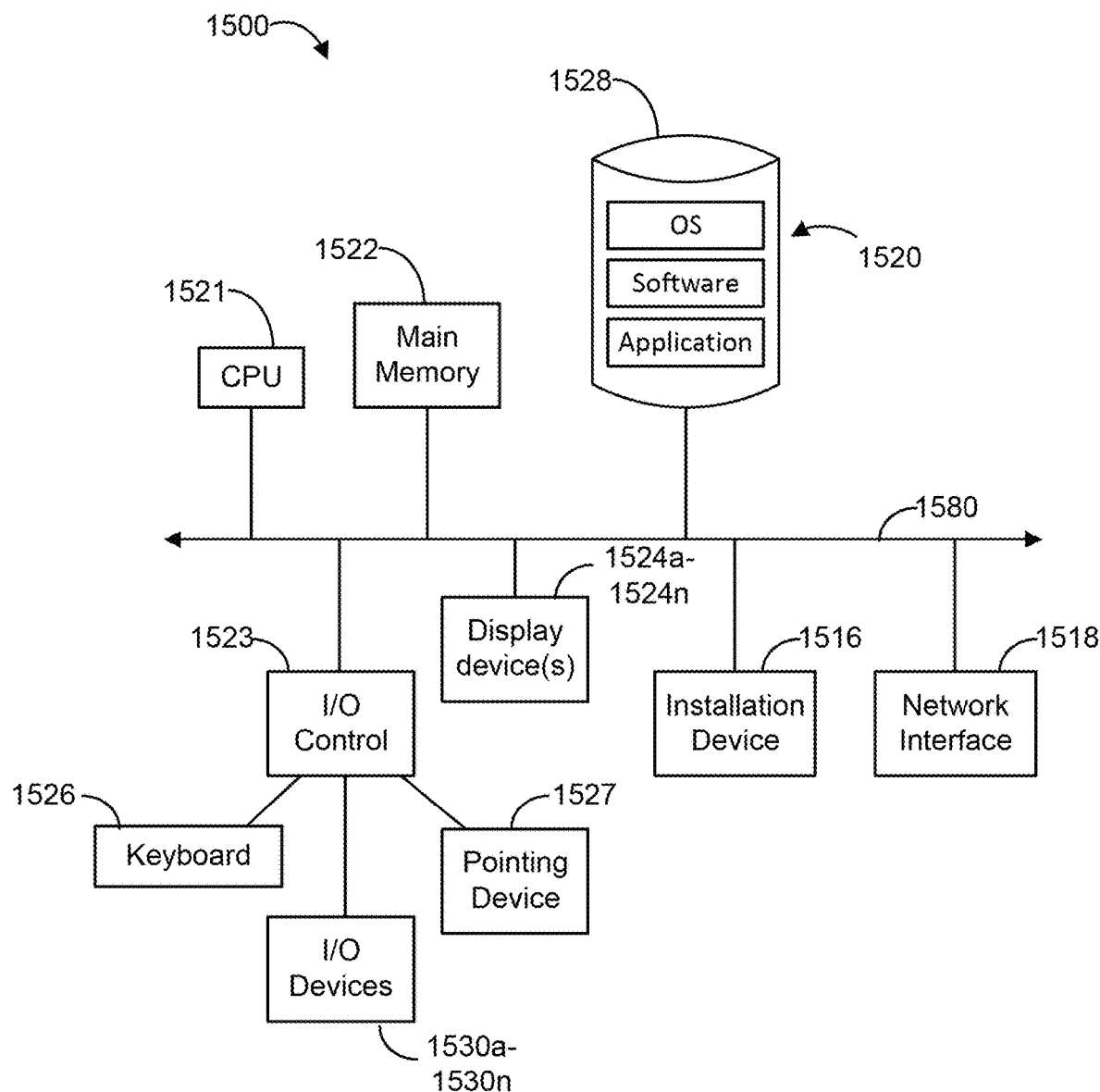
FIGS. 15A and 15B are block diagrams depicting embodiments of computing devices useful in connection with the methods and systems described herein.
Figure 15B:
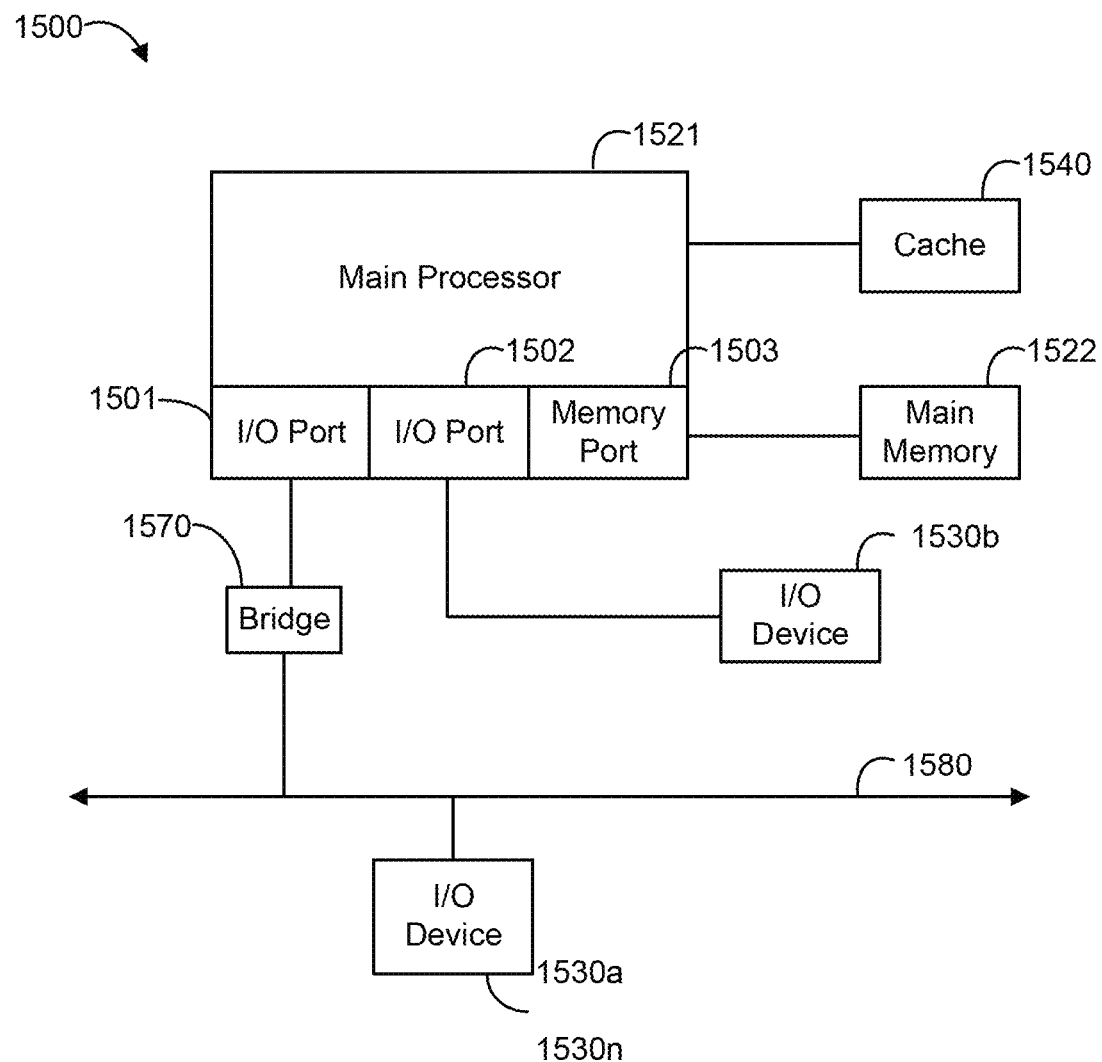

The systems discussed herein may be deployed as and/or executed on any type and form of computing device, such as a computer, network device or appliance capable of communicating on any type and form of network and performing the operations described herein. FIGS. 15A and 15B depict block diagrams of a computing device 1500 useful for practicing an embodiment of the systems and methods described herein. As shown in FIGS. 15A and 15B, each computing device 1500 includes a central processing unit 1521, and a main memory unit 1522. As shown in FIG. 15A, a computing device 1500 may include a storage device 1528, an installation device 1516, a network interface 1518, an I/O controller 1523, display devices 1524a-1524n, a keyboard 1526 and a pointing device 1527, such as a mouse. The storage device 1528 may include, without limitation, an operating system and/or software. As shown in FIG. 15B, each computing device 1500 may also include additional optional elements, such as a memory port 1503, a bridge 1570, one or more input/output devices 1530a-1530n (generally referred to using reference numeral 1530), and a cache memory 1540 in communication with the central processing unit 1521.

The central processing unit 1521 is any logic circuitry that responds to and processes instructions fetched from the main memory unit 1522. In many embodiments, the central processing unit 1521 is provided by a microprocessor unit, such as: those manufactured by Intel Corporation of Mountain View, California; those manufactured by International Business Machines of White Plains, New York; or those manufactured by Advanced Micro Devices of Sunnyvale, California. The computing device 1500 may be based on any of these processors, or any other processor capable of operating as described herein.

The main memory unit 1522 may be one or more memory chips capable of storing data and allowing any storage location to be directly accessed by the central processing unit 1521, such as any type or variant of Static random access memory (SRAM), Dynamic random access memory (DRAM), Ferroelectric RAM (FRAM), NAND Flash, NOR Flash and Solid State Drives (SSD). The main memory unit 1522 may be based on any of the above described memory chips, or any other available memory chips capable of operating as described herein. In the embodiment shown in FIG. 15A, the central processing unit 1521 communicates with main memory unit 1522 via a system bus 1580 (described in more detail below). FIG. 15B depicts an embodiment of a computing device 1500 in which the processor communicates directly with the main memory unit 1522 via a memory port 1503. For example, in FIG. 15B the main memory unit 1522 may be DRDRAM.

FIG. 15B depicts an embodiment in which the central processing unit 1521 communicates directly with cache memory 1540 via a secondary bus, sometimes referred to as a backside bus. In other embodiments, the central processing unit 1521 communicates with cache memory 1540 using the system bus 1580. Cache memory 1540 typically has a faster response time than main memory unit 1522 and is provided by, for example, SRAM, BSRAM, or EDRAM. In the embodiment shown in FIG. 15B, the central processing unit 1521 communicates with various I/O devices 1530 via a local system bus 1580. Various buses may be used to connect the central processing unit 1521 to any of the I/O devices 1530, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 1524, the central processing unit 1521 may use an Advanced Graphics Port (AGP) to communicate with the display 1524. FIG. 15B depicts an embodiment of a computer 1500 in which the central processing unit 1521 may communicate directly with I/O device 1530b, for example via HYPERTRANSPORT, RAPIDIO, or INFINIBAND communications technology. FIG. 15B also depicts an embodiment in which local busses and direct communication are mixed: the central processing unit 1521 communicates with I/O device 1530a using a local interconnect bus while communicating with I/O device 1530b directly.

A wide variety of I/O devices 1530a-1530n may be present in the computing device 1500. Input devices include keyboards, mice, trackpads, trackballs, microphones, dials, touch pads, touch screens, and drawing tablets. Output devices include video displays, speakers, inkjet printers, laser printers, projectors and dye-sublimation printers. The I/O devices may be controlled by an I/O controller 1523 as shown in FIG. 15A. The I/O controller may control one or more I/O devices such as a keyboard 1526 and a pointing device 1527, e.g., a mouse or optical pen. Furthermore, an I/O device may also provide storage and/or an installation device 1516 for the computing device 1500. In still other embodiments, the computing device 1500 may provide USB connections (not shown) to receive handheld USB storage devices such as the USB Flash Drive line of devices manufactured by Twintech Industry, Inc., of Los Alamitos, California.

Referring again to FIG. 15A, the computing device 1500 may support any suitable installation device 1516, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 1500 may further include a storage device, such as one or more hard disk drives or redundant arrays of independent disks, for storing an operating system and other related software, and for storing application software programs such as any program or software 1520 for implementing (e.g., configured and/or designed for) the systems and methods described herein. Optionally, any of the installation devices 1516 could also be used as the storage device. Additionally, the operating system and the software can be run from a bootable medium.

Furthermore, the computing device 1500 may include a network interface 1518 to interface to the network through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 1500 communicates with other computing devices 1500' via any type and/or form of gateway or tunneling protocol such as Secure Socket Layer (SSL) or Transport Layer Security (TLS). The network interface 1518 may include a built-in network adapter, network interface card, PCMCIA network card, card bus network adapter, wireless network adapter, USB network adapter, modem or any other device suitable for interfacing the computing device 1500 to any type of network capable of communication and performing the operations described herein.

In some implementations, the computing device 1500 may include or be connected to one or more display devices 1524a-1524n. As such, any of the I/O devices 1530a-1530n and/or the I/O controller 1523 may include any type and/or form of suitable hardware, software, or combination of hardware and software to support, enable or provide for the connection and use of the display device(s) 1524a-1524n by the computing device 1500. For example, the computing device 1500 may include any type and/or form of video adapter, video card, driver, and/or library to interface, communicate, connect or otherwise use the display device(s) 1524a-1524n. In one embodiment, a video adapter may include multiple connectors to interface to the display device(s) 1524a-1524n. In other embodiments, the computing device 1500 may include multiple video adapters, with each video adapter connected to the display device(s) 1524a-1524n. In some implementations, any portion of the operating system of the computing device 1500 may be configured for using multiple displays 1524a-1524n. One ordinarily skilled in the art will recognize and appreciate the various ways and embodiments that a computing device 1500 may be configured to have one or more display devices 1524a-1524n.

In further embodiments, an I/O device 1530 may be a bridge between the system bus 1580 and an external communication bus, such as a USB bus, an Apple Desktop Bus, an RS-232 serial connection, a SCSI bus, a FireWire bus, a FireWire 500 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 1500 of the sort depicted in FIGS. 15A and 15B may operate under the control of an operating system, which control scheduling of tasks and access to system resources. The computing device 1500 can be running any operating system, such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to, Android, produced by Google Inc.; WINDOWS 7 and 8, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system 1500 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 1500 has sufficient processor power and memory capacity to perform the operations described herein.

In some implementations, the computing device 1500 may have different processors, operating systems, and input devices consistent with the device. For example, in one embodiment, the computing device 1500 is a smart phone, mobile device, tablet or personal digital assistant. In still other embodiments, the computing device 1500 is an Android-based mobile device, an iPhone smart phone manufactured by Apple Computer of Cupertino, California, or a Blackberry or WebOS-based handheld device or smart phone, such as the devices manufactured by Research In Motion Limited. Moreover, the computing device 1500 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some implementations, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C #, PROLOG, or in any byte code language such as JAVA. The software programs or executable instructions may be stored on or in one or more articles of manufacture as object code.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Any references to ranges or values can be references to approximations of the same ranges or values. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A method comprising:
    partitioning a renewable energy powerplant (REPP) into at least two partitions for a period of time, wherein the at least two partitions each include an allocation of a total energy capacity of the REPP to deliver energy during the period of time;
    defining a first bidding strategy of a first partition of the at least two partitions for the period of time, wherein the first partition includes a first allocation of capacity;
    defining a second bidding strategy of a second partition of the at least two partitions for the period of time, wherein the second partition includes a second allocation of capacity;
    discharging energy from the REPP according to the first bidding strategy of the first partition and the second bidding strategy of the second partition;
    generating a first score for the first bidding strategy of the first partition and a second score for the second bidding strategy of the second partition based on the discharging energy from the REPP according to the first bidding strategy of the first partition and the second bidding strategy of the second partition,
        wherein the generating the first score for the first bidding strategy is based at least on an amount of energy that was discharged to an energy grid from the first partition, a change in state of charge of an energy storage system (ESS) of the first partition, and a value of energy under the first bidding strategy;
    adjusting the at least two partitions based on the first score and the second score; and
    discharging energy from the REPP according to the adjusted at least two partitions.

2. The method of claim 1, wherein defining the first bidding strategy comprises assigning a first dynamic value to first energy of the first partition for the period of time and defining the second bidding strategy comprises assigning a second dynamic value to second energy of the second partition for the period of time.

3. The method of claim 1, wherein adjusting the at least two partitions comprises:
    comparing the first score of the first bidding strategy with the second score of the second bidding strategy; and
    responsive to the first score exceeding the second score, increasing a first energy capacity of the first partition and decreasing a second energy capacity of the second partition.

4. The method of claim 3, wherein increasing the first energy capacity and decreasing the second energy capacity comprises increasing the first energy capacity to the total energy capacity of the REPP and decreasing the second energy capacity to zero.

5. The method of claim 3, further comprising:
storing, in memory, a maximum limit for the first partition and a minimum limit for the second partition,
wherein increasing the first energy capacity and decreasing the second energy capacity comprises:
determining a first increase in the first energy capacity would cause the first energy capacity to exceed the maximum limit for the first partition or a first decrease in the second energy capacity would cause the second energy capacity to be below the minimum limit for the second partition; and
adjusting the first increase in the first energy capacity to the maximum limit for the first partition or the first decrease in the second energy capacity to the minimum limit for the second partition.

6. The method of claim 1, further comprising:
subsequent to adjusting the at least two partitions, determining the period of time has ended; and
responsive to determining the period of time has ended, resetting the first partition to a defined first energy capacity and the second partition to a defined second energy capacity.

7. The method of claim 1, wherein partitioning the REPP into the at least two partitions comprises causing a sum of energy capacities of the at least two partitions to equal the total energy capacity of the REPP.

8. The method of claim 1, further comprising:
adjusting the at least two partitions without regard to any scores for any bidding strategies of the at least two partitions prior to an end of the period of time.

9. The method of claim 1, further comprising:
determining a mean value rate for the at least two partitions based on performance of bidding strategies of the at least two partitions;
determining a value rate delta for each of the at least two partitions based on a difference between a value rate of the partition and the mean value rate; and
determining the first partition corresponds to a highest value rate,
wherein adjusting the at least two partitions comprises increasing the first allocation of capacity for the first partition based on the first partition corresponding to the highest value rate.

10. The method of claim 9, further comprising:
determining a value rate range for the at least two partitions; and
determining an increase for the first allocation based on an available increase for the first allocation, the value rate range, and the value rate delta of the first partition,
wherein increasing the first allocation of capacity for the first partition comprises increasing the first allocation by the determined increase for the first allocation.

11. The method of claim 10, wherein the method comprises:
determining the available increase for the first allocation as a function of the first allocation of capacity and a maximum allocation of capacity for the first partition.

12. A system, comprising:
a renewable energy powerplant (REPP) coupled to an energy grid; and
one or more processors configured to:
partition the REPP into at least two partitions for a period of time to deliver energy during the period of time, wherein the at least two partitions each include an allocation of a total energy capacity of the REPP;
define a first bidding strategy of a first partition of the at least two partitions for the period of time, wherein the first partition includes a first allocation of capacity;
define a second bidding strategy of a second partition of the at least two partitions for the period of time, wherein the second partition includes a second allocation of capacity;
discharge energy from the REPP according to the first bidding strategy of the first partition and the second bidding strategy of the second partition;
generate a first score for the first bidding strategy of the first partition and a second score for the second bidding strategy of the second partition based on the discharge of energy from the REPP according to the first bidding strategy of the first partition and the second bidding strategy of the second partition,
wherein the one or more processors are configured to generate the first score for the first bidding strategy based at least on an amount of energy that was discharged to the energy grid from the first partition, a change in state of charge of an energy storage system (ESS) of the first partition, and a value of energy under the first bidding strategy;
adjust the at least two partitions based on the first score and the second score; and
discharge energy from the REPP according to the adjusted at least two partitions.

13. The system of claim 12, wherein the one or more processors are configured to define the first bidding strategy by assigning a first dynamic value to first energy of the first partition for the period of time and defining the second bidding strategy comprises assigning a second dynamic value to second energy of the second partition for the period of time.

14. The system of claim 12, wherein the one or more processors are configured to adjust the at least two partitions by:
comparing the first score of the first bidding strategy with the second score of the second bidding strategy; and
responsive to the first score exceeding the second score, increasing a first energy capacity of the first partition and decreasing a second energy capacity of the second partition.

15. A non-transitory computer-readable media comprising instructions that, when executed by one or more processors, cause the one or more processors to:
partition a renewable energy powerplant (REPP) into at least two partitions for a period of time, wherein the at least two partitions each include an allocation of a total energy capacity of the REPP to deliver energy during the period of time;
define a first bidding strategy of a first partition of the at least two partitions for the period of time, wherein the first partition includes a first allocation of capacity;
define a second bidding strategy of a second partition of the at least two partitions for the period of time, wherein the second partition includes a second allocation of capacity;
discharge energy from the REPP according to the first bidding strategy of the first partition and the second bidding strategy of the second partition;
generate a first score for the first bidding strategy of the first partition and a second score for the second bidding strategy of the second partition based on the discharge of energy from the REPP according to the first bidding strategy of the first partition and the second bidding strategy of the second partition,
wherein the instructions cause the one or more processors to generate the first score for the first bidding strategy based at least on an amount of energy that was discharged to an energy grid from the first partition, a change in state of charge of an energy storage system (ESS) of the first partition, and a value of energy under the first bidding strategy;
adjust the at least two partitions based on the first score and the second score; and
discharge energy from the REPP according to the adjusted at least two partitions.

* * * * *